United States Patent
Raptopoulos et al.

(10) Patent No.: US 9,384,668 B2
(45) Date of Patent: Jul. 5, 2016

(54) TRANSPORTATION USING NETWORK OF UNMANNED AERIAL VEHICLES

(71) Applicant: Singularity University, Moffett Field, CA (US)

(72) Inventors: Andreas Raptopoulos, Palo Alto, CA (US); Darlene Damm, Mountain View, CA (US); Martin Ling, Edinburgh (GB); Ido Baruchin, San Francisco, CA (US)

(73) Assignee: Singularity University, Moffet Field, CA (US)

( * ) Notice: Subject to any disclaimer, the term of this patent is extended or adjusted under 35 U.S.C. 154(b) by 290 days.

(21) Appl. No.: 13/890,165

(22) Filed: May 8, 2013

(65) Prior Publication Data

US 2014/0032034 A1 Jan. 30, 2014

Related U.S. Application Data

(60) Provisional application No. 61/644,978, filed on May 9, 2012, provisional application No. 61/644,983, filed on May 9, 2012, provisional application No. 61/693,191, filed on Aug. 24, 2012.

(51) Int. Cl.
| | |
|---|---|
| G08G 5/00 | (2006.01) |
| G05D 1/10 | (2006.01) |
| G01S 13/93 | (2006.01) |
| G01S 13/94 | (2006.01) |
| G08G 5/02 | (2006.01) |
| G08G 5/04 | (2006.01) |
| G01S 5/00 | (2006.01) |

(52) U.S. Cl.
CPC .............. *G08G 5/0069* (2013.01); *G05D 1/104* (2013.01); *G01S 5/0009* (2013.01); *G01S 13/9303* (2013.01); *G01S 13/94* (2013.01); *G08G 5/0086* (2013.01); *G08G 5/025* (2013.01); *G08G 5/045* (2013.01)

(58) Field of Classification Search
CPC ........ G08G 5/00; G08G 5/0069; G05D 1/104
See application file for complete search history.

(56) References Cited

U.S. PATENT DOCUMENTS

| | | | | |
|---|---|---|---|---|
| 4,834,321 | A * | 5/1989 | Granger | 244/110 E |
| 6,311,107 | B1 * | 10/2001 | Curto et al. | 701/14 |
| 7,035,856 | B1 * | 4/2006 | Morimoto | 705/7.12 |
| 8,576,064 | B1 * | 11/2013 | Mitchell | 340/539.11 |
| 8,909,391 | B1 * | 12/2014 | Peeters et al. | 701/2 |
| 2004/0249519 | A1 * | 12/2004 | Frink | 701/3 |
| 2011/0084162 | A1 * | 4/2011 | Goossen et al. | 244/12.1 |
| 2011/0202206 | A1 * | 8/2011 | Karthikeyan et al. | 701/3 |
| 2011/0264311 | A1 * | 10/2011 | Lee et al. | 701/15 |
| 2014/0124621 | A1 * | 5/2014 | Godzdanker et al. | 244/110 E |

* cited by examiner

*Primary Examiner* — Mussa A Shaawat
*Assistant Examiner* — Kelly D Williams
(74) *Attorney, Agent, or Firm* — Morrison & Foerster LLP

(57) ABSTRACT

Embodiments described herein include a delivery system having unmanned aerial delivery vehicles and a logistics network for control and monitoring. In certain embodiments, a ground station provides a location for interfacing between the delivery vehicles, packages carried by the vehicles and users. In certain embodiments, the delivery vehicles autonomously navigate from one ground station to another. In certain embodiments, the ground stations provide navigational aids that help the delivery vehicles locate the position of the ground station with increased accuracy.

33 Claims, 13 Drawing Sheets

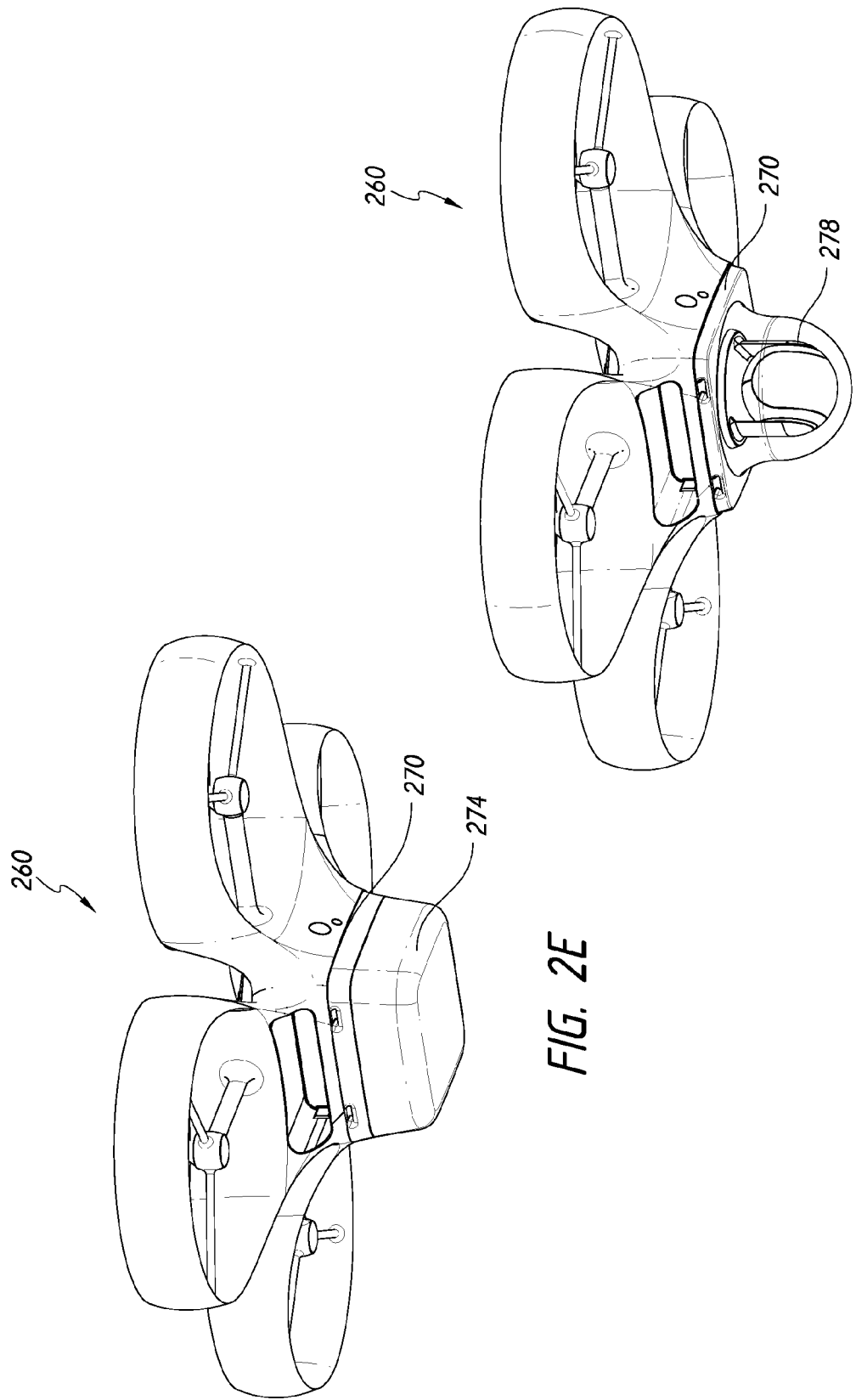

TRANSPORTATION USING NETWORK OF UNMANNED AERIAL VEHICLES

PRIORITY CLAIM AND RELATED APPLICATIONS

This application claims a priority benefit under 35 U.S.C. §119(e) from U.S. Provisional Patent Application No. 61/644,978, filed on May 9, 2012, titled "Unmanned Aircraft System," U.S. Provisional Patent Application No. 61/644,983, filed on May 9, 2012, titled "System and Method for Transportation of Good Using Unmanned Aircraft Vehicle," and U.S. Provisional Patent Application No. 61/693,191, filed on Aug. 24, 2012, titled "System and Method for Transportation of Good Using Unmanned Aircraft Vehicle." The present application incorporates the foregoing disclosures herein by reference.

FIELD

The present disclosure relates to systems and methods for transportation of goods using autonomous and/or remotely piloted unmanned aircraft vehicles. In particular, the disclosure provides a flexible, adaptable, modular and scalable logistics system and architecture for transportation of goods and/or people by unmanned aircraft vehicles.

BACKGROUND

Modern local transportation networks rely heavily on ground infrastructure for the transportation of goods and people. More than half of the earth's population now lives in cities, with more than half a billion people living in megacities with populations exceeding 10 million people. In these high-density urban environments demand on ground transportation infrastructure has increased and continues to increase to the point that many metropolitan areas are heavily congested and road transportation networks are very inefficient. For example, the Texas Transportation Institute estimated that, in 2000, the 75 largest metropolitan areas experienced 3.6 billion vehicle-hours of delay, resulting in 5.7 billion gallons (21.6 billion liters) in wasted fuel and $67.5 billion in lost productivity. Traffic congestion is increasing in major cities and delays are becoming more frequent in smaller cities and rural areas. The inefficiencies are also dramatic in cities in many emerging countries or other locations where ground infrastructure has not scaled quickly enough to follow the population increase or the growth in the economy. In these places a new, scalable method of transportation that would reduce the demand on road infrastructure would be very desirable At the same time, road infrastructure is non-existent or, at best, underdeveloped in many places in the developing world. More that one Billion people do not have access to all season roads today and are disconnected from all social and economic activity for some part of the year: they are unable to receive medicine or critical supplies reliably and they cannot get their goods to market in order to create a sustainable income. In Sub-Saharan Africa, for instance, 85% of roads are unusable in the wet season. Investments are being made, but at the current rate of investment, it's estimated it's going to take these nations more than 50 years to catch up.

In much of the developed world, the cost efficiencies of many courier systems rely on the 'spoke-hub' distribution model. For example, to ship a package between two neighboring districts in a city, a vehicle has to pick up the parcel, take it to the sorting center (a facility usually several miles away from the city center), then back into the city center to deliver it to the destination. This model works well for reducing the cost of shipment where it's possible to aggregate packages that share a big part of the journey from origin to destination; it becomes inefficient though, if the ability to aggregate is diminished, as is the case in 'last mile' delivery problems.

At the same time personalized and decentralized access to information has become ubiquitous enabled by the expansion of the Internet and wireless telephony. Access to physical goods, however, remains hindered by the sometimes inflexible, inefficient (in energy, time and cost) transportation solutions of the present day. Modern digital connectedness amplifies the need for disruption of the current way goods and people are transported. Modern transportation solutions have significantly lagged behind the digital revolution.

SUMMARY

Certain embodiments of the present disclosure include methods and systems for air transportation of goods and/or people using autonomous and/or remotely piloted unmanned aircraft vehicles (UAV). In particular, the systems include the following components: autonomous electric flying vehicles, automated ground stations, and logistics software that operates the system.

In certain embodiments, the delivery system comprises one or more unmanned delivery vehicles configured for autonomous navigation, a plurality of ground stations configured to communicate with the one or more unmanned delivery vehicles and provide location information to the one or more unmanned delivery vehicles to aid in locating a ground station location and a processor configured to identify a route from a first of the plurality of ground stations to a second of the plurality of ground stations based on geographic data and providing the route to the one or more unmanned delivery vehicles for use in the autonomous navigation from the first to the second ground station. In an embodiment, the one or more unmanned delivery vehicles are aerial vehicles. In some embodiments the aerial vehicles comprise a fixed wing and one or more rotors.

In embodiments, the aerial vehicles comprise a package interface capable of accepting a package for transport on the delivery system. In certain embodiments, the aerial vehicles comprise safety measures for protecting the package. In embodiments, the safety measures include one or more of a parachute or an airbag.

In certain embodiments, the processor is configured to recognize demand patterns and position the one or more unmanned delivery vehicles in a location to meet the demand pattern. In an embodiment, the logistics system authorizes the route for the one or more unmanned delivery vehicles. In an embodiment, the information provided by the ground stations is a pattern on a landing pad. In certain embodiments, the delivery system further comprises a plurality of batteries for the one or more unmanned delivery vehicles.

In an embodiment, the plurality of ground stations stores and charges the plurality of batteries for the one or more unmanned delivery vehicles. In an embodiment, the geographic data is a series of waypoints for use with a global navigation satellites system. In certain embodiments, the information provided by the ground station allows the one or more unmanned delivery vehicles to identify the ground station location with greater accuracy than is provided by the waypoints.

In certain embodiments, a ground station is used for a delivery system of unmanned aerial vehicles, the ground station comprising a landing location configured to receive one or more unmanned aerial delivery vehicles, a communications interface configured to communicate with the one or more unmanned delivery vehicles and at least one additional ground station, and a guidance measure configured to assist the one or more unmanned delivery vehicles in locating the landing location. In certain embodiments, the guidance measure comprises a pattern printed on the landing location. In an embodiment, the guidance measure comprises an ultra-wideband beacon. In certain embodiments, the ground station further comprises a weather monitoring system. In some embodiments, the weather monitoring system is capable of measuring the wind speed. In an embodiment, the ground station further comprises a robotic system for changing batteries of the one or more unmanned delivery vehicles. In an embodiment, the landing location comprises a cavity capable of physically containing a package.

In certain embodiments, the ground station is portable. In embodiments, the ground station further comprises a solar panel capable of providing power to the ground station. In an embodiment, the ground station further comprises a charger capable of charging batteries of the one or more unmanned delivery vehicles. In an embodiment, the system for guiding comprises a series of waypoints for use with a global navigation satellites system. In an embodiment, the system for guiding further comprises a beacon that allows the one or more unmanned delivery vehicles to identify a ground station location with greater accuracy than is provided by the waypoints. In an embodiment, the system for guiding further comprises a pattern printed on the landing location.

In certain embodiments, a computer system manages a delivery system of unmanned aerial vehicles comprising one or more hardware processors in communication with a computer readable medium storing software modules including instructions that are executable by the one or more hardware processors, the software modules including at least: a vehicle routing module that determines a route between a first ground station and a second ground station for an unmanned aerial vehicle; a vehicle tracking module that provides the current location of an unmanned aerial vehicle; a package routing module that determines a delivery path for a package, the delivery path including the first and second plurality of ground stations; a package tracking module providing the current location of the package on the delivery path; and a route authorization module that conditionally authorizes the unmanned aerial vehicle to fly the route between the first and second ground stations to move the package along the delivery path for the package.

In an embodiment, the software modules further comprise a weather monitoring module configured to determine appropriate flying conditions between the first and second ground station and communicate with the route authorization module to authorize the flight when the conditions are appropriate. In an embodiment, the vehicle routing module includes stored information from a successful flight of the unmanned aerial vehicle while under the control of a pilot. In an embodiment, the route authorization module is configured to refuse to authorize a flight based on a user command.

BRIEF DESCRIPTION OF THE DRAWINGS

The following drawings and the associated descriptions are provided to illustrate embodiments of the present disclosure and do not limit the scope of the claims.

FIG. 2E shows a bottom perspective view of an embodiment of an unmanned aerial vehicle with a package payload.

FIG. 2F shows a bottom perspective view of an embodiment of an unmanned aerial vehicle with a camera payload.

DETAILED DESCRIPTION OF THE PREFERRED EMBODIMENTS

Figure 1:
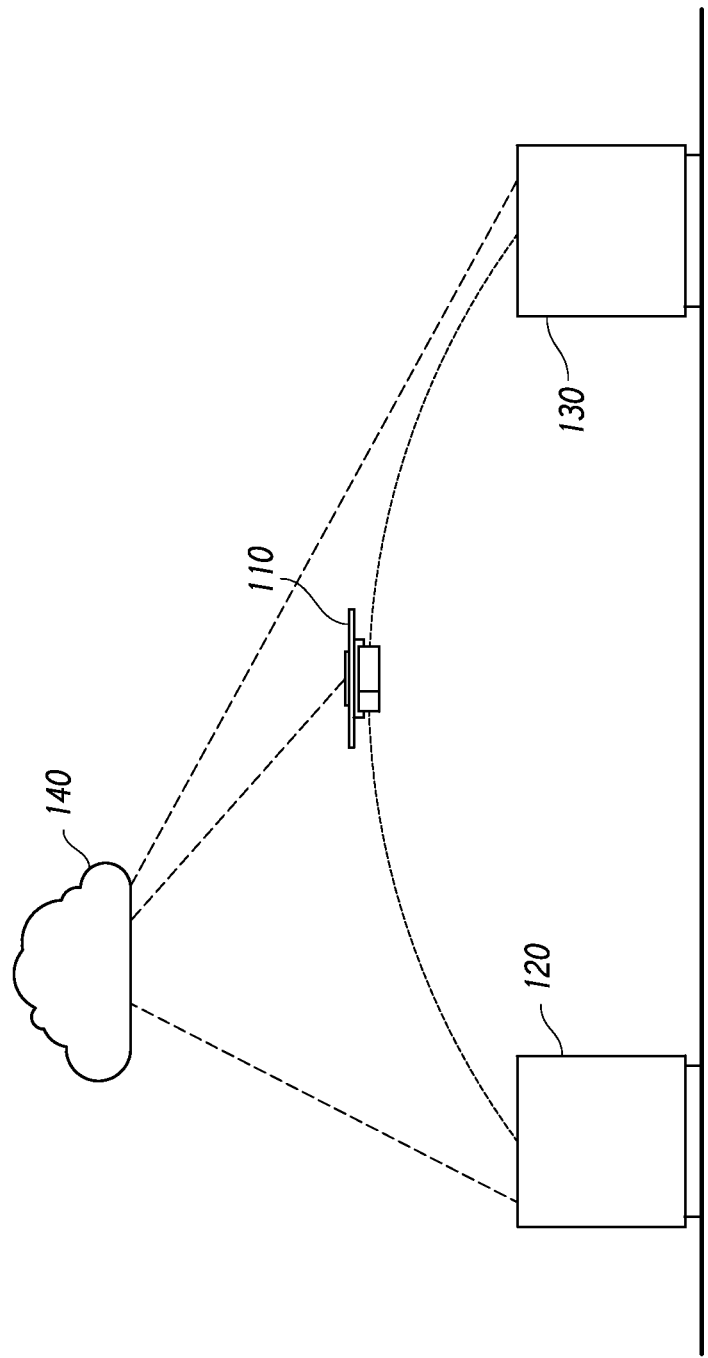
FIG. 1 shows an embodiment of a delivery or transportation system using a network of unmanned aerial vehicles and its components, including ground stations, an unmanned aerial vehicle, and a logistics network.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims that follow this description and not by any particular embodiment described herein.

Delivery System

The disclosure relates to systems and methods for air transportation of goods and/or people, using autonomous and/or remotely piloted unmanned aerial vehicles (UAV). In particular, the disclosure describes the following components: autonomous electric flying vehicles, ground stations, and a logistics software and network. Overall, the delivery system provides a flexible, adaptable, modular and scalable logistics system architecture for civil air transportation of goods and/or people by unmanned aerial vehicles (UAV). In many locations this new, scalable method of transportation would reduce the demand on road infrastructure. In such places a method of transportation that would not depend on building roads would allow increases in economic output, without the heavy investments required for building road infrastructure or increasing road traffic. Additionally, the time it takes to deliver an individual package is much longer with a hub and spoke system, compared to the same package being transported directly between the origin and destination. The disclosed systems and methods could complement the Internet and wireless telephony developments that have occurred over the last decades.

The system takes advantage of timely advances in related technologies to enable cost effective operation. Battery storage capacity is increasing, while battery weight is reducing. In addition, advances in photovoltaics, combined with novel technologies such as energy beaming, make the larger flight range for UAVs more promising. Also, alternative energy sources are expanding, increasing the possibility of remotely operating such a system, even in locations with insufficient power grids. Advances in manufacturing and nanotechnology are providing stronger and lighter materials for building UAVs and are allowing for increased efficiency and reduced operational costs for UAVs. Advances in the technology and reduction in the cost of sensors are opening new applications for UAVs.

The disclosed delivery system can serve vastly differing needs. For example, in congested urban centers, there are highly developed transportation clusters. However, these clusters become inefficient without having the technological capability to expand and satisfy growing needs. Also, undeveloped regions, such as isolated rural areas, are cut off from existing global transportation networks because the regions lack adequate roads and/or centralized hub ports to meet their basic economic needs. Both of these differing needs can be served by easing the flow of goods and people using the disclosed delivery system.

FIG. 1 shows an embodiment of the disclosed delivery system. The delivery system is comprised of one or more unmanned aerial vehicles 110, ground stations 120 and 130, and a logistics system and network 140.

The system shown in FIG. 1 can be used to transport a package from ground station 120 to ground station 130. The user provides the package at ground station 120. The package can be placed in the ground station 130. Alternatively, the user can place the package on or in the UAV. In an embodiment, the user identifies himself with a code on his phone, a slot opens up in ground station 120 and he deposits the box. In certain embodiments, the box can then be scanned for explosives and liquids. If the box passes the scan, the ground station, UAV, logistics system, or user can request authorization for the route from the network 140. If the route is authorized by the network 140, the system can notify the user, for example, by sending a text message to the user and to the recipient, that a shipment has been initiated. In certain embodiments, the system can provide an estimated time of arrival. An unmanned aerial vehicle 110 is selected for the flight and picks up the package and a battery from the ground station 120. The UAV can then fly the authorized route. In certain embodiments, the UAV 110 takes of vertically to a height of 400 ft into the authorized route.

After flying the route, the unmanned aerial vehicle 110 arrives at destination ground station 130. The destination ground station can then assist the unmanned aerial vehicle in determining a precise location for landing. After the landing, the system can inform the recipient that a package is available. In an embodiment, the recipient receives a text that a package is waiting for collection. The recipient then arrives at the station 130 to pick up the package. In an embodiment, the recipient scans a barcode from her phone and receives the package through the slot in ground station 130. The network 140, in addition to authorizing the route, can provide real-time information on all vehicles, packages, and batteries running through the system. In certain embodiments, this information can be provided to users, local aviation authorities, or other people or system with a need to access the information.

Unmanned Aerial Vehicles

As described with respect to FIG. 1, one of the components of the disclosed delivery system is an unmanned aerial vehicle (UAV) 110. The UAVs for the system pick up, carry, and drop off payloads and/or people from one physical location to another. In an embodiment, the UAVs are capable of swapping a battery or fuel cell, recharging or refueling on the way to a final destination. Embodiments of UAVs are shown in FIGS. 2A-2F. However, several other UAV types are possible, and the UAV embodiments shown in FIGS. 2A-2F are merely examples. One popular UAV type, for example, is known as a quadcopter, also called a quadrotor helicopter, quadrocopter, or quad rotor. Generally, a quadcopter is an aerial rotorcraft that is propelled by four rotors. In certain embodiments, control of UAV motion is achieved by altering the pitch or rotation rate of one or more rotors. One well known quadrotor UAV is the Aeryon Scout designed by Aeryon Labs. Lockheed Marin Procerus Technologies has also developed vertical take-off and landing quadrotor UAVs. Less expensive commercial options such as the Draganflyer X4 from DraganFly Innovations Inc. have further shown the viability of cost-effective quadrotor UAVs. The CyberQuad MAXI from Cyber Technology provides another example of an electric, ducted, vertical take-off and landing UAV. Other configurations are also possible for suitable UAVs, including multi-rotor designs such as, for example, dual rotor, trirotor, hexarotor, and octorotor, or single-rotor designs such as helicopters. Fixed wing UAVs may also be suitable for certain aspects of the delivery system. In addition to these examples, suitable UAVs can be developed specifically for use in the disclosed delivery system, as shown in the embodiments of FIGS. 2A-2F.

UAVs suitable for use in the disclosed delivery system can be autonomous or remotely piloted. For example, a UAV can be remotely piloted on a route in order to provide flight data for subsequent autonomous flights. Similarly, should weather, environmental, or other issues develop during an autonomous flight, a remote pilot can operate the UAV. A UAV can also be switched from remote pilot operation to autonomous flight. For example, a remote pilot may operate on a portion of the route and then switch the UAV to autonomous operation.

The UAVs may be rotorcraft, fixed wing, or hybrid. In certain embodiments, the UAV has vertical take-off and landing (VTOL) capability. In certain embodiments, the UAV uses symmetrically pitched blades. Symmetrically pitched blades can eliminate the need for cyclic operation (as in a helicopter), where the blades are adjusted based on the blade's position in the rotor disc to vary the pitch angle as they spin. These symmetrically pitched blade designs can also eliminate mechanical linkages to vary the rotor blade pitch angle, simplifying maintenance and design of the vehicle. Also, by using multiple smaller diameter blades, the individual smaller rotors can cause less damage if they hit anything. In an embodiment, the rotors are made from soft and energy absorbing materials that are impact resistant. In some embodiments, the UAVs have frames that enclose the rotors. Enclosing the rotors can have advantages, such as reducing the risk of damaging either the UAV or its surroundings. The propulsion system can also be ducted. For certain embodiments, hybrid UAVs, fixed wing architectures combined with VTOL capability, allow for greater aerodynamic efficiency, and thus the UAV is able to fly further for the same battery load. In certain embodiments, the UAV can be a compound rotorcraft, for example, having wings that provide some or all of the lift in forward flight. In an embodiment, the UAV can be a tiltrotor aircraft.

The UAVs can have electronic control systems and sensors. The control systems and sensors can help stabilize the UAV in certain embodiments. The control systems also can provide the embedded control for aerial flight of the UAV. For example, the control system can alter aspects of a rotor or ducted assembly to change the flight dynamics (yaw, pitch, and roll) of the UAV, the lift generated, angle of attack, velocity, or other suitable flight characteristics. The sensors can be wired or wireless, depending on the needs of the UAV or delivery system. The sensors can be relative, including, for example, inertial, IMUs, accelerometers, gyroscopes, or pressure based, or absolute, including, for example, GPS or GLONASS, magnometers, pulsed-RF ultrawideband (UWB), or cameras.

The UAVs can fly between any two geo-locations. In certain embodiments, a geo-location is equipped with one or more components of the delivery system, such as a ground station. The UAV can use Global Navigation Satellites Systems (GNSS) such as Global Positioning System (GPS) and/or Global Navigation Satellite System (GLONASS) for sub-meter localization. The UAV can also navigate using relative sensors, such as, for example, inertial measurement units (IMU), accelerometers, gyroscopes, inertial navigation systems, gravity sensors, external speed sensors, pressure sensors, altitude sensors, barometric systems, magnetometer or other sensors with or without navigation satellites during take-off, in flight, and to assist in landing. In an embodiment, an IMU allows the UAV to navigate when GPS signals are unavailable. The IMU can be a wireless IMU. These features can allow the UAV to move between locations autonomously, for example, by relying on known waypoints. In an embodiment, the UAV performs gross navigation with GNSS to approach a known location. The UAV can also rely on the fusion of its relative sensors with GNSS and magnetometers, for example, during post-take-off and pre-landing flight to achieve accuracy within meters. In certain embodiments, the sensors can be augmented with UWB when within short range of a ground station, for example within 100 meters, or in known GNSS poor locations, to achieve navigational accuracy within centimeters. Finally, the UAV can augment its sensors with UWB and cameras for take-off and landing to achieve navigational accuracy within millimeters. In some embodiments, the UAV can have a camera to assist in take-off and landing. The camera can also serve other functions such as keeping a surveillance log of activities around the UAV. Navigational assistance can be provided by a camera on the UAV, an external camera, such as a camera located at a ground station, or both.

The UAVs can be configured to communicate wirelessly with other components of the delivery system in certain embodiments. The communication can establish data link channels between different system components used, for example, for navigation, localization, data transmission, or the like. The wireless communication can be any suitable communication medium, including, for example, cellular, packet radio, GSM, GPRS, CDMA, WiFi, satellite, radio, RF, radio modems, ZigBee, XBee, XRF, XTend, Bluetooth, WPAN, line of sight, satellite relay, or any other wireless data link. The vehicles can serve as communications transceivers, communicating with ground stations, other UAVs, or the logistics system infrastructure. In an embodiment, a UAV serves as a wireless repeater. The UAV can also accept navigation commands. The navigation commands can be real-time, for example, when flown by a remote pilot, or less than real-time, such as a series of one or more navigation commands. The navigation command can follow a protocol such as MAVLink or APM or can be proprietary. The UAVs can receive and transmit signals providing real-time state characterization, such as, for example, location, velocity, destination, time, package status, weather conditions, UAV system status, energy system state, energy system needs status, system load, or other real-time or near real time state characterizations. The data link channels can be different for different embodiments of the delivery system components. For example, the data link between a UAV and a ground station may be different than the data link between ground stations or between a ground station and the logistics system. Furthermore, a data link channel may not exist at all for all members of a class of components, such as a UAV. In an embodiment, a UAV of the delivery system operates without a data link.

In addition to navigational commands, the UAV can communicate with the logistics system to receive higher-level commands such as, for example, pick up a package, fly to a destination, swap a battery, change power status (such as power on, power off, sleep, enter low power mode), or the like. The navigational commands can similarly be of a high level in nature, such as, for example, take-off, land, mission authorized, change destination, return to starting location, or the like. The UAV also can communicate with the logistics system or ground station to provide location information, battery or fuel level, package status, destination, or the like, as also previously described.

In certain embodiments, the UAVs can be modular. For example, the payloads and batteries can be exchanged readily. Other aspects of the UAV can also be modular, such as a rotor assembly, control system, or structural frame. The UAVs can also possess structural plasticity, providing the ability to change or adapt to changes in its structure. In an embodiment, the UAV may include nano-materials. The UAVs can distribute one or more of their internal or external parts or payload into their structural frame. For example, the batteries can be distributed in the UAV frame. In an embodiment, the payload is distributed into the UAV structural frame. In certain embodiments, the UAV contains one or more ducted fan assemblies. In certain embodiments, the UAV contains one or more shrouded-prop assemblies.

The UAVs can have safety features. For example, the UAVs can be equipped with a parachute. In an embodiment, the UAV deploys a parachute upon a mid-air collision, or component failure. In an embodiment, the UAV deploys a parachute in a failure mode. One purpose of the parachute is to prevent injury to people, and not to only prevent damage to the vehicle, payload, or property. The parachute can be deployed if the UAV determines that the UAV is no longer able to follow its desired trajectory, or if it is about to run out of batteries, or other system failure. The parachute can also be deployed based on a low-level watch-dog circuit on the UAV if it no longer receives a heart-beat from the vehicle software, indicative of computation failure. Further, the parachute can be deployed by the delivery system for unforeseeable causes. The UAV can also be equipped with an airbag in some embodiments. For example, the UAV may deploy an airbag prior to a detected ground collision. The UAV can also include safety features related to control and navigation. For example, if the command or control link between the UAV and the ground station is broken because of environmental or technological issues, the UAV can execute pre-programmed maneuvers. For example, the pre-programmed maneuvers can direct the UAV to hover or circle in the airspace for a certain period of time to reestablish its communication link. If the link is not reestablished, then the UAV can return to a known location, such as the launch location in some embodiments. The UAV can also chose to land at its current location in an embodiment. In certain embodiments, a virtual perimeter or geo-fence can be setup for a UAV as an additional safety measure. The geo-fence can be dynamically generated around a ground station or other location, or can be a predefined set of boundaries. In an embodiment, a UAV crossing a geo-fence can trigger a warning to an operator of the delivery network. In an embodiment, the warning is a text message or email.

UAV design can include specific features that make it more suitable for use in a delivery system. In an embodiment, the UAV is electrically powered in a mechanically simple configuration with minimal moving parts. Such a design can reduce maintenance requirements and increase reliability. In an embodiment, the UAV has redundant key components. This can allow the UAV to continue flying safely in the event of a component failure. The UAV can also have comprehensive in-flight monitoring. In an embodiment, data regarding the UAV is logged and centrally collected. In an embodiment, UAV data is analyzed for failure prediction. The UAVs can be designed to be weather resistant and robust. For example, the UAVs may include a ruggedized design to reduce the environmental impact of dust, dirt, wind, water, snow, or other environmental hazards. The UAVs can have a wind sealed design. In certain embodiments, the UAVs are designed to operate reliably in adverse weather, temperature extremes, or high wind.

Different UAVs types can serve different purposes in the delivery network. For example, UAVs can vary in dimension, capacity, and range to serve different needs. For short distances with small payloads, the UAVs can be smaller in size. For longer range or capacity missions, the UAVs can scale in size accordingly. Furthermore, for longer distance missions, different UAV designs, such as fixed wing, may be more advantageous. For smaller missions, the UAVs may have a target payload capacity of approximately 2 kilograms. For larger missions, the vehicles may carry payloads up to 100-500 kilograms. For shorter missions, the UAVs may travel up to approximately 10 kilometers. For medium missions, the UAVs may travel 20-40 kilometers. For longer ranges, the UAVs may cover up to 1000 kilometers. Very long range UAVs may even perform longer distance flights, for example, between continents.

Figure 2A:
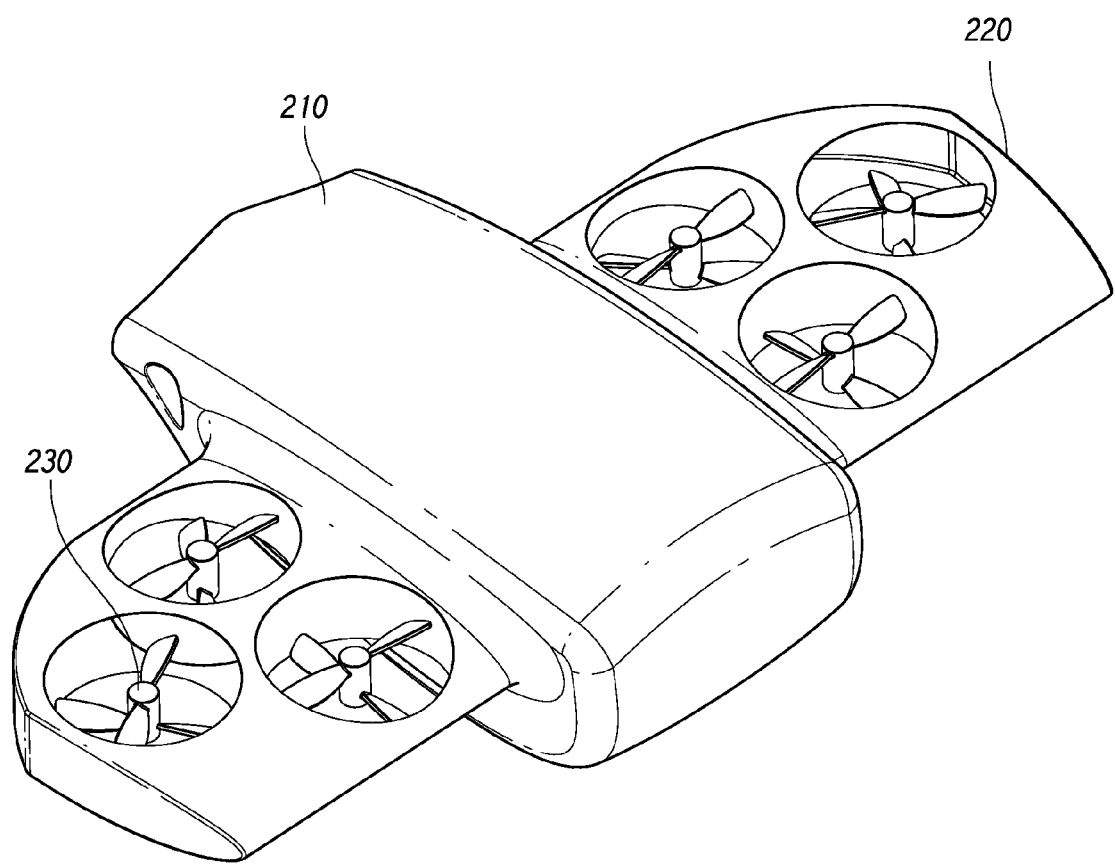
FIG. 2A shows a perspective view of an embodiment of an unmanned aerial vehicle.
Figure 2B:
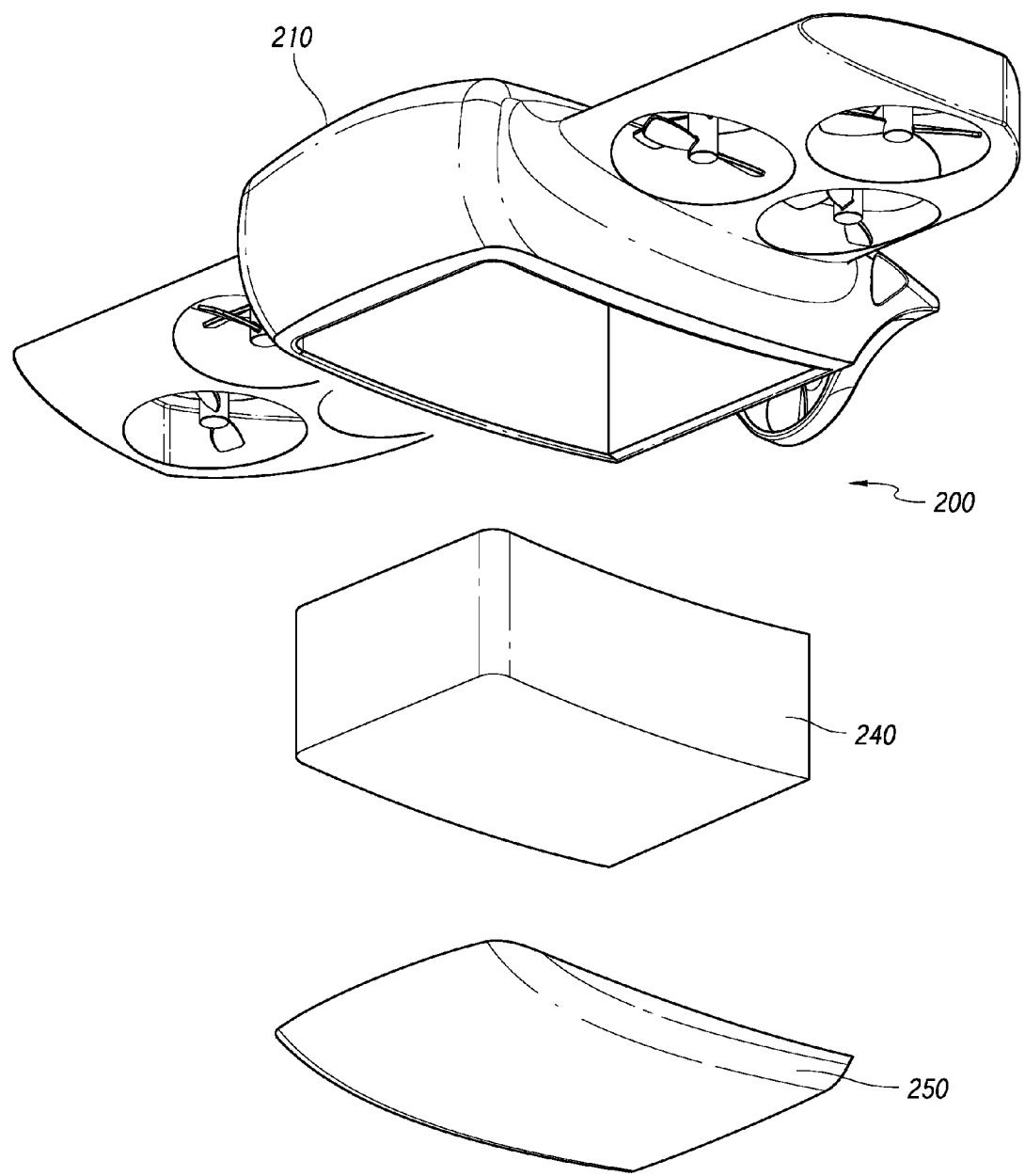
FIG. 2B shows an exploded perspective view of the unmanned aerial vehicle of FIG. 2A.

Returning to the embodiment shown in FIGS. 2A and 2B, the UAV includes several features. FIG. 2A is a perspective view of the UAV. The UAV includes a body or main frame 210. The frame 210 provides the structure of UAV. The frame 210 can be tailored to the application for the UAV. The UAV shown in FIGS. 2A and 2B is a hybrid design with fixed wings 220 and rotors 230. The rotors 230 can also be a ducted assembly in certain embodiments. The fixed wings 220 can provide the UAV with extended range operation in comparison to certain rotor only embodiments. The rotors 230 are incorporated into the fixed wing 220, providing VTOL capability and the ability to hover.

In general, design parameters for specifying suitable UAVs include vehicle lift to drag ratio and ratio of headwind to airspeed. The lift to drag ratio should generally be as large as possible, although tradeoffs may be made to accommodate for other design parameters such as load capacity, size, and cost. In an embodiment, the UAV has a lift to drag ratio during steady flight of greater than 3.0. The UAV can also be designed for a large maximum airspeed. In an embodiment, the UAV has a cruising velocity of greater than 40 km/hour. In certain embodiments, the UAV has a maximum payload of approximately 2 kilograms. The weight of the UAV without a payload in those embodiments can be less than 4 kilograms. The battery weight of such a UAV can be approximately 2 kilograms. The target range of such a UAV is approximately 10 kilometers with headwinds of up to 30 km/hour and currently produced battery capacities and densities.

FIG. 2B provides an exploded perspective view of the UAV 200 shown in FIG. 2A. As shown, the UAV 200 includes a frame 210 with a cavity. The cavity is sized such that it can incorporate a payload 240 and a battery 250. FIG. 2B also shows that the payload 240 or battery 250 can form structural aspects of the UAV 200 or the frame 210. In an embodiment, the battery 250 forms a structural component of the UAV 200. As further shown in FIG. 2B, the payload 240 can comprise a modular container. The modular container can attach to the UAV 200. The modular container can be optimized in dimension and shape for carrying diverse payloads. Either the payload 240 or the battery 250 can be optimized to attach to the frame 210.

Figure 2C:
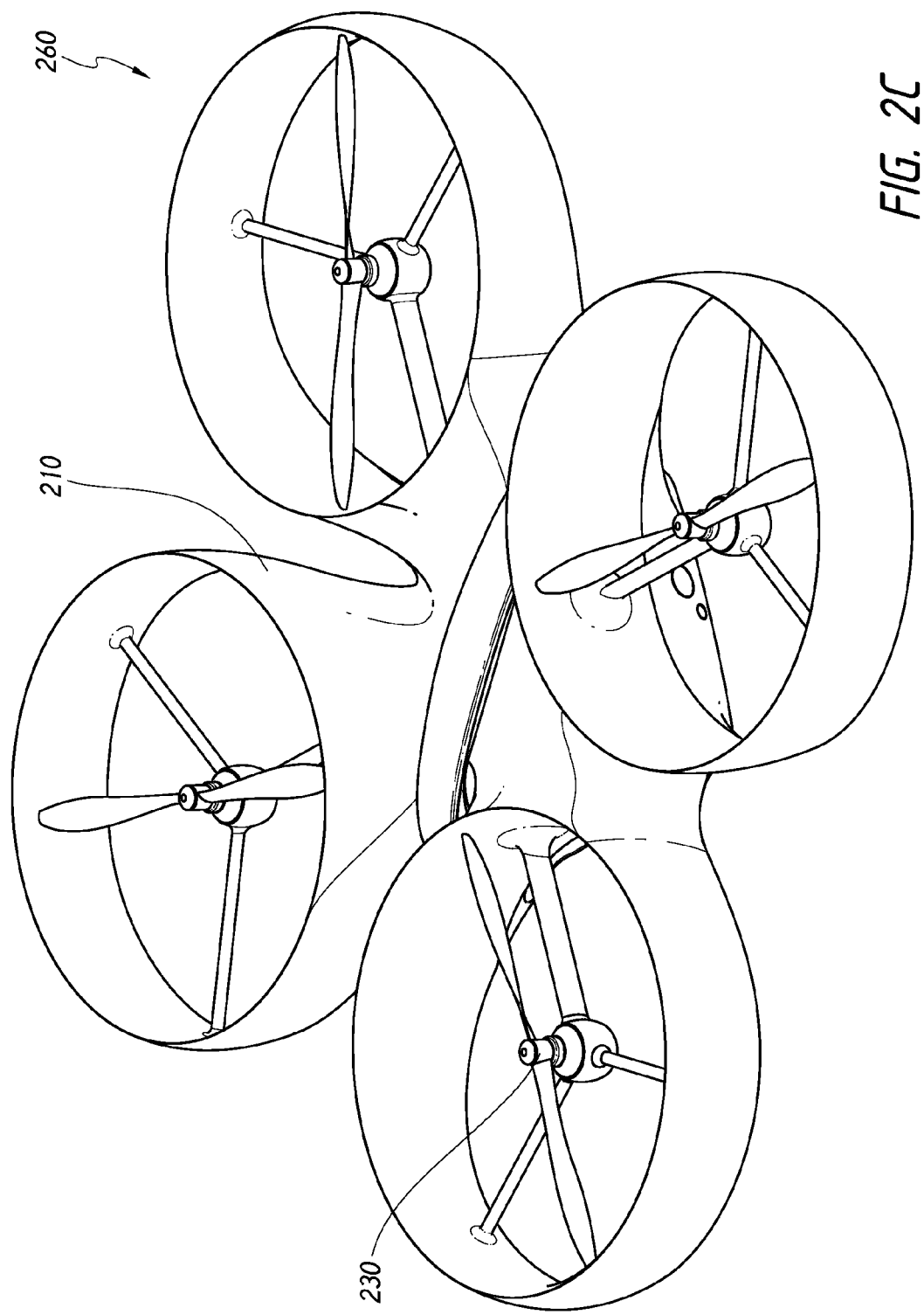
FIG. 2C shows a perspective view of an embodiment of an unmanned aerial vehicle.

FIG. 2C provides a top perspective view of another UAV 260. UAV 260 is a quadcopter design. UAV 260 also includes a frame 210. UAV 260 also includes rotors 230. In the quadcopter design shown in FIG. 2C, there are four rotors 230. In certain embodiments, rotors 230 are ducted. However, unlike the embodiment of FIGS. 2A and 2B, UAV 260 does not include a fixed wing.

Figure 2D:
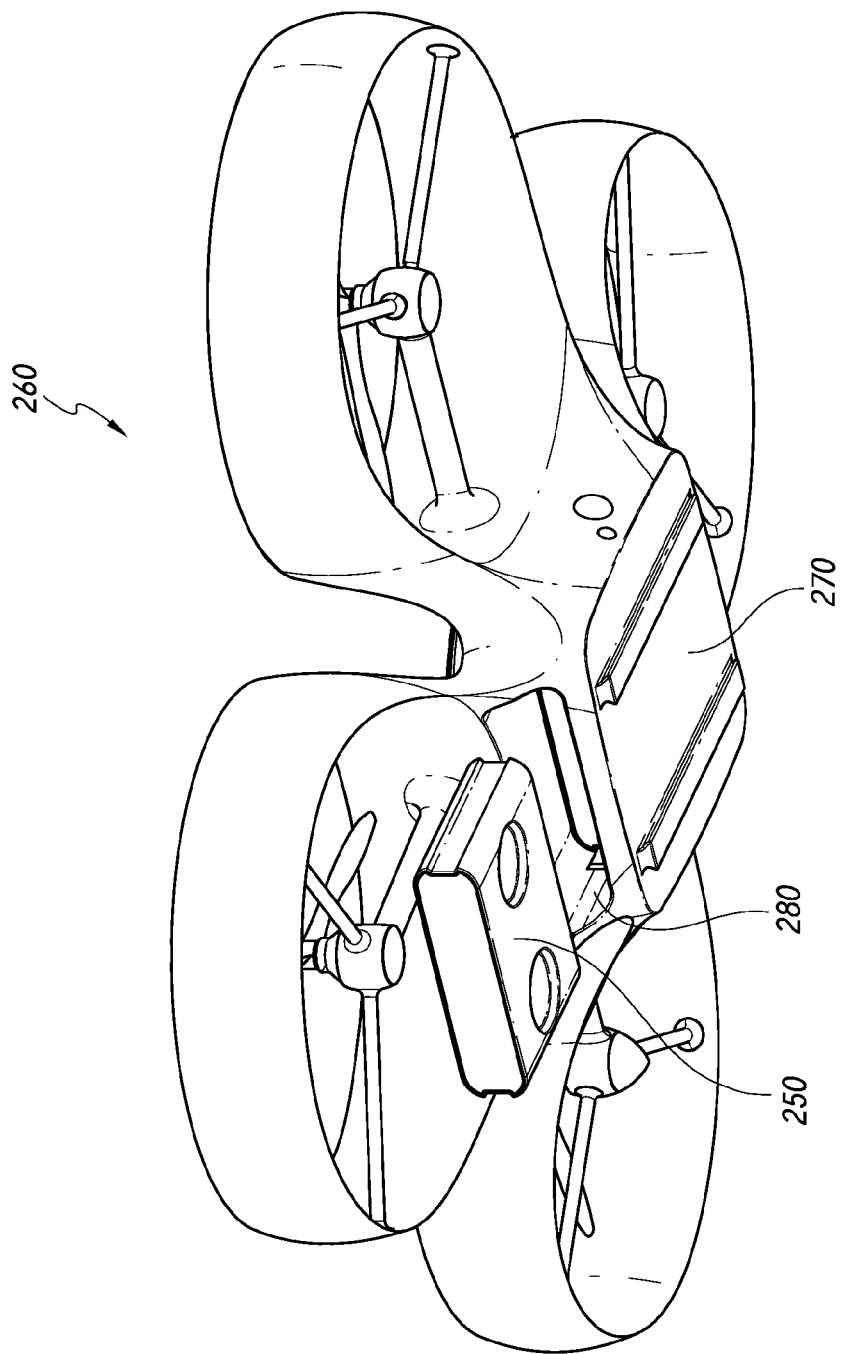
FIG. 2D shows a bottom perspective view of an embodiment of an unmanned aerial vehicle with a removable battery.

FIG. 2D shows a bottom perspective view of UAV 260. UAV 260 has a payload interface 270. Payload interface 270 allows UAV 260 to carry a wide variety of payloads. The payload interface 270 provides a standard mechanism for the use of different payloads. The payload interface 270 can be mechanical, electrical, or a combination of mechanical and electrical. The payload interface 270 can also include a plurality of electrical connectors for providing power and signal sharing between the UAV and the payload. As a further example, payload interface 270 can be magnetic or include a magnetic lock. The payload interface 270 allows UAV 260 to be configured to carry simple mechanical payloads, or more complex payloads. For example, the payload can be a package carrier, a camera, a sensor array, a communications interface, audio/visual equipment, broadcast equipment, or other suitable payloads. UAV 260 can also have a battery interface 280. Battery interface 280 allows for the swapping of batteries, such as the battery 250 shown in FIG. 2D. To swap, the battery 250 can be inserted or removed from UAV 260. By performing a battery swap, the UAV 260 can be provided with a battery with sufficient capacity and charge state to perform an anticipated flight mission. The swap can be performed, for example, by a human, through a robotic interface (for example, in a ground station), or through a combination of a robotic interface and human interaction. In an embodiment, the battery swap is performed robotically.

FIG. 2E shows a bottom perspective view of another embodiment of UAV 260. In the shown embodiment, UAV 260 includes a payload interface 270. A container 274 is attached to payload interface 270, permitting the UAV 270 to transport matter in the container. As shown in FIGS. 2E and 2F, the payload interface 270 can be standardized to allow for differing payloads. The payload interface 270 can include a mechanical coupling for the payload to the UAV. In an embodiment, the payload interface 270 includes a plurality of ribs. In certain embodiments, the ribs include a substantially trapezoidal shape cross-section that interfaces with a corresponding recessed shape in the payload. Other shapes of ribs and recessed shapes will also provide similar functionality. For example, in an embodiment, the ribs have a cross section "L" shape. The payload can have a corresponding shaped for engaging the ribs. The payload interface 270 can also be of other suitable designs. For example, the payload interface can include a recess for accepting a mechanical pivot on one or more sides of the interface. The payload interface can leverage technologies developed for mobile computer batteries or similar mechanical interfaces. In use the payload interface engage a payload to secure it to the body if the UAV 260. The payload interface can include a positive securing mechanism that locks the payload in the secured position. The locking mechanism can be either on the payload interface or on the payload itself.

The UAV can also gather data from the sky to perform missions other than package delivery. In certain embodiments, the UAV can be equipped with sensor payloads. For example, the UAV can be equipped with a camera. Equipping the UAV with a sensor payload can expand the potential use of the delivery system. With a sensor payload, the UAV and delivery network can perform functions such as, for example, search and rescue, area monitoring, real-time mapping, or other missions. In an embodiment, the UAV is equipped with a camera to performing a mapping function.

FIG. 2F shows a bottom perspective view of another embodiment of UAV 260. In the embodiment of FIG. 2F, UAV 260 also includes a payload interface 270. A camera 278 is attached to payload interface 270, permitting UAV 270 to transport the camera 278 to take pictures and/or video. In an embodiment, UAV 270 carries a camera 278 to take pictures. In an embodiment, the pictures are sent to a logistics network. In an embodiment, the camera 278 is used for taking a series of pictures.

The UAV battery sizing and capacity can be based on a number of factors. For example, the battery can be advantageously chosen to meet specified requirements. For example, the energy density, ratio of headwind to airspeed, mass of the payload, mass of the vehicle without payload, flight distance, flight elevation, flight elevation gain, power transfer efficiency, and lift to drag ratio can all be used to specify a battery weight. The following table provides definitions for a these requirements, and sample values for one UAV embodiment.

TABLE 1

Calculating Minimum Battery Weight

| Requirement | Description | Units | Sample Value | Embodiment Notes |
|---|---|---|---|---|
| M | Payload | kg | 2 | |
| f | Vehicle to payload mass ratio | — | 2 | mass of vehicle w/out payload = 4 kg |
| R | Lift to drag ratio | — | 3 | very conservative |
| D | Hop Distance | km | 5 | |
| H | Hop elevation gain | km | 0.2 | |
| G | Gravity constant | m/s² | 9.81 | |
| η | Power transfer efficiency (motor plus - propeller) | — | 0.5 | reasonable designed propeller and electric motor |
| E | Energy consumed by electronics per Hop | kJ | 100 | |
| J | Energy density | kJ/kg | 900 | good lithium-ion battery |

The following equation provides for the calculation of the weight of the battery based on these requirements:

$$\text{Minimum Battery Weight} = \frac{1}{J}\left(\frac{(1+f)MG}{\eta}\left(H + \frac{D}{R(1-v)}\right) + \frac{E}{1-v}\right)$$

Based on the sample values of the embodiment provided in Table 1, the minimum battery weight is 1.2 kilograms. Different values for the requirements shown in Table 1 will result in different minimum battery weights.

The UAV's energy cost and consumption can also be calculated based on requirements and parameters. For example, the energy cost per mission can depend on a number of factors such as the mass of the payload, mass of the UAV without payload, the distance of the mission, the height of the flight, the cost of electricity, and other factors. The following table provides definitions for a these requirements, and sample values for one UAV embodiment.

TABLE 2

Energy Cost and Consumption for UAV

| Requirement | Description | Units | Sample Value | Embodiment Notes |
|---|---|---|---|---|
| C | Cost of electricity | $/kWh | 0.1 | Residential rate |
| | | | 0.3 | Solar power rate |
| M | Payload | kg | 2 | |
| f | Vehicle to payload mass ratio | — | 2 | mass of vehicle w/out payload = 4 kg |
| R | Lift to drag ratio | — | 3 | very conservative, |
| D | Hop Distance | km | 5 | |
| H | Hop elevation gain | km | 0.2 | |
| G | Gravity constant | m/s² | 9.81 | |
| η | Power transfer efficiency (motor plus propeller) | — | 0.5 | reasonable designed propeller and electric motor |
| E | Energy consumed by electronics per Hop | kJ | 100 | |
| e | Battery efficiency | — | 0.95 | conservative lower bound to charging efficiency |

The following equation provides a way to calculate the weight of the battery based on these requirements:

$$\text{Mission Cost} = \frac{C}{e \cdot 3,600}\left(\frac{(1+f)MG}{\eta}\left(H + \frac{D}{R}\right) + E\right)$$

Based on the sample values of the embodiment provided in Table 2, the mission cost is 0.93 cents for residential power. In another embodiment, changing the hop distance to 10 km and the hop elevation gain to 1 km, and the battery efficiency to 0.8, the mission cost is approximately 2 cents for residential power, and approximately 6 cents for solar power. In an embodiment, the UAV is designed to have an energy consumption of approximately 2.4 kWh/day.

The UAV can be designed to fly in temperatures ranging from 0 degrees Celsius up to 40 degrees Celcius. Operation outside those temperature extremes can result in potential ice buildup or overheating of electronics and is therefore less advantageous. In certain embodiments, specially designed UAVs are configured to operate in the extreme temperatures. For example, a UAV can be equipped with cooling equipment such as heat sinks, fans, or solid state thermoelectric devices that permit high temperature operation. In another example, a UAV can be equipped with de-icing features to permit low temperature operation. The UAV can be designed to fly at altitudes of up to 10,000 feet, and be optimized to fly at lower altitudes, such as 1,000 feet. The UAVs can operate in segregated airspace, generally below an altitude of 400 ft and not near airports or helipads. The UAVs can be capable of flying into sustained headwinds of up to 30 km/hour. The UAV, as previously described, can be designed to withstand moderate rain, with the main limitation being wind that generally accompanies rain.

While the UAVs generally select flight paths based on destination commands and predetermined flight paths, the UAVs can also include the ability to avoid obstacles. The UAVs can sense and avoid other flying vehicles or obstacles, for example, by relying on a UAV sensor bank. In certain embodiments, the UAVs have the capability to select flight paths based on destination commands and to detect landing station for automatic landing. Additionally, the UAVs can be capable of detecting and avoiding stationary obstacles, such as, for example, trees, buildings, radio towers, and the like and also detecting and avoiding moving objects, such as, for example, birds, aircraft, and the like. A UAV can therefore adjust its flight path. In an embodiment, a UAV detects a stationary object and reports the stationary object back to the delivery system. In an embodiment, a UAV flight path avoids a stationary object based on information received from the delivery system. The UAVs can also have a beacon to announce itself, for example, to other aircraft or electronic monitoring equipment. In an embodiment, a UAV has artificial intelligence that prevents the UAV from hitting a person if the UAV experiences a problem.

Ground Station

Another component of the disclosed delivery system is a ground station. FIG. 1 shows a delivery system with two ground stations, 120 and 130. Ground stations are locations that act as routers or route waypoints for the delivery system. The ground stations can be hardware or a combination of hardware and software. They can also supply the power for the system, including the UAVs and/or the logistics system. The ground stations can serve as automatic take-off and landing locations for the UAVs in certain embodiments. The ground stations also can serve as charging, refueling, or battery swapping locations for the UAVs. In certain embodiments, the ground stations store charged batteries or fuel for the UAVs that supply power to the UAVs. In addition, the ground station can optionally perform package buffering by having the capability to store packages in transit. In certain embodiments, the ground station automatically handles packages coming in on UAVs or to be flown out on UAVs. The ground station also serves as a communications hub for the delivery system in some embodiments.

Users interact with the ground station to send and receive their packages. The ground station can also serve, more generally, as an interface for any two components of the delivery system, such as the logistics system and UAV, the ground station itself and the UAV, or the ground station itself and the logistics system. In an embodiment, the ground station serves as a high-bandwidth communications hub for a UAV. For example, the UAV and ground station can communicate to exchange data such as location, telemetry data, health monitoring, status, package information, energy output, remaining capacity, time, weather, route status, obstructions, or the like. These communications can be in real time during the flight, following the flight, or prior to the flight depending on the needs of the delivery system. For example, in an embodiment, the ground station provides firmware updates to a UAV. Firmware updates may be advantageously performed while the UAV is docked in a ground station. In an embodiment, the ground station updates the software of a UAV. The software updates might occur while the UAV is docked, or in real time. For example, in flight, the environmental status of a flight path can change. If such a change occurs, the ground station can communicate the change to the UAV to adjust the flight plan. In an embodiment, the ground station provides route information to a UAV.

The ground station and the logistics system can communicate to exchange data such as remaining capacity, package information, battery status, time, weather, route information, or the like. The UAV and logistics system can also communicate directly. In certain embodiments, the ground station comprises a portion of the logistics system. For example, the ground station can include or house one or more servers that perform methods or contain modules for use in the logistics system, as more fully described with respect to the logistics system. In an embodiment, the ground stations comprise the logistics system for a delivery system.

The ground station can also interface with external interfaces such as, for example, the Internet, a cellular network, a data network, a WiFi network, satellite, radio, or other suitable external interfaces. As previously described, the ground station can include a portion or all of the logistics system. The ground station can also serve as a community access point. For example, the ground station can serve as a tower or repeater for cellular access or a WiFi hotspot.

The ground station also can be embedded with a user interface in certain embodiments. For example, the ground station can include a display or monitor for providing information to a user. The ground station can also include interfaces for accepting input from a user, including, for example, a touch screen, mouse, keyboard, trackpad, tactile interfaces, buttons, scroll wheels, remote control, voice command system, or other suitable interfaces. The ground station and/or logistics system can also provide a remote interface for user interaction with the system. For example, a user can interact with a website or application on a mobile device that communicates with the ground station and/or logistics system. The website or application can provide information about the system to the user or accept input from the user. For example, the website or application can provide status information. The system can also provide for the control and/or monitoring of the entire system or components thereof through a website or application. In an embodiment, a mobile application provides for the interaction of a user with the ground station or logistics system to obtain tracking information about a package. Such a mobile application can also allow the user to schedule a package drop off or locate a suitable ground station, for example, through identification of a current location or a desired location. Such a website or application can send or receive information through communication with one or more ground stations or with the logistics system. The interface can authenticate a mobile phone or use a minimal identifier, to deliver a package to a user. The system can identify a user, for example, through RFID-type identifier, visual pattern on mobile phone, username and password, biometric scan, or other suitable identifier.

The ground station can also assist in the guidance and maintenance of UAVs. The ground station can provide guidance information in multiple ways. The ground station can be a known location for the UAVs, for example, through a GPS waypoint or with a known latitude and longitude. The ground station can also optionally include information that can help guide the UAV to its location. In an embodiment, the ground station provides signals to the UAV to help guide a UAV it its location. For example, the ground station can include one or more beacons that provide data about its location. The location data can be more accurate than what is provided by GPS or by stored coordinates. For example, the ground station can provide an ultra-wide band beacon that help guide a UAV to a precise landing position. The ground station can be equipped with a sensor suite to control the landing or take-off of the UAV. The ground station can also include other positioning aids, such as radio frequency location methods, including time difference of arrival, or simpler aids such as patterns provided on a landing pad. The ground station can also optionally include WiFi positioning system, an address, or other locator to help identify its geolocation. The sensors can assist with geographic information systems, mapping displays, radiolocation technologies, direction finding, or provide other suitable positioning information or location based services. The ground station can also include cameras to assist with the control of the UAV.

In an embodiment, the UAV landing is assisted by the ground station. The UAV autonomously navigates from one ground station to a second ground station, using, for example, GPS information or stored flight tracks. Once with UAV is within a relatively short range of the destination ground station, the UAV begins receiving guidance information from the ground station. This can be provided, for example, through the use of a UWB beacon located at the ground station. The ground station can also communicate guidance data to the UAV to more actively control its landing. In an embodiment, the ground station includes a sensor array capable of detecting the position of a UAV. The sensor array can also provide movement data for the UAV to determine how it is moving in response to controls and to adjust its control. The sensor array can include, for example, tactile sensors, sonar, infrared arrays, radar, or the like to help obtain information relevant to control the landing of a UAV. The sensors can also detect local environmental data such as wind speed, temperature, humidity, precipitation, and the like to assist in controlling the landing of a UAV. The ground station can also use cameras for machine vision to further guide the UAV to land at the ground station. Such a sensor array and/or machine vision can be used to aid in take-off of the UAV as well. The ground station can also obtain data, such as environmental data, from external sources. For example, local weather conditions can be obtained from external sources such as weather stations, other ground stations, or other sources. Using these techniques, the UAV can be guided to a much more accurate landing that allows for smaller landing spots and decreased risk of collision.

The ground station can include one or more docks for landing and take-off of UAVs. By doing so, the ground station can provide a known location for interaction with the UAVs. The ground station also can provide a safe environment for the UAVs when they are not flying between stations. In certain embodiments, the ground station can also include one or more bays such as a battery storage bay, a packet or package storing bay (for payloads), and UAV storage bays. The ground station can maintain information about the bays such as, for example, number of bays, location, capacity, current status, dimensions, or other suitable information. The battery storage bays can provide for storage, charging, conditioning, or analysis of batteries. The ground station can maintain information about the batteries (including those located in the storage bays) that can be provided upon request to the logistics system or a user. The information about the battery can include, for example, capacity, age, technical specifications, rating, number of charge cycles, temperature, weight, dimensions, number of missions, or other relevant information. The information in the ground station can also be stored in or backed up to the logistics system or elsewhere in the system. The data can also be sent to the servers of the logistics system from either the ground station or the UAV.

The ground station can also include the capability to exchange loads or batteries for the UAVs. In an embodiment, robotic machinery inside the ground station exchanges payloads or batteries for a UAV. The ground station can allow for swaps and recharges of batteries. The ground station can also include an interface for a user to assist in the exchange of loads or batteries for a UAV.

The ground station can service multiple UAVs simultaneously. In an embodiment with V as the number of vehicles, G as the number of ground stations, and M as the maximum number of vehicles housed by a single ground station, the product of G times M is greater than V (G*M>V) with a margin sufficient to accommodate an uneven distribution of vehicles relative to the ground stations.

A logistics system can comprise different types of ground stations. For example, a low complexity ground station includes, for example, a landing pad with landing sensors. In such an embodiment, a human could swap payloads for the UAVs. A medium complexity ground station includes additional robotic machinery for automatic swapping of batteries and/or loads. A higher complexity ground station includes integrated parcel and multiple batter storage capacity. The power station can also include climate control. Multiple ground stations can be disposed adjacent to each other for increased capacity or the like.

The ground station can be powered through the electrical grid, solar panels, wind power, or other power sources. In an embodiment, the power consumption of the ground station is approximately 100 watts per UAV. This power is used for swapping batteries and packages, beacons for the UAV, sensors, charging batteries, and communication with the logistics system. The ground station also can perform operations for the provisioning of energy for the system in certain embodiments. For example, the ground station can match battery capacity or current charge state to a particular UAV flight mission to optimize energy use for the delivery system.

The ground station optionally includes spare parts for the UAV. For example, the ground station can house spare motors, control circuitry, wings, bodies, propellers, rotors, or the like. In an embodiment, a ground station includes a 3D printer for printing spare parts.

Figure 3A:
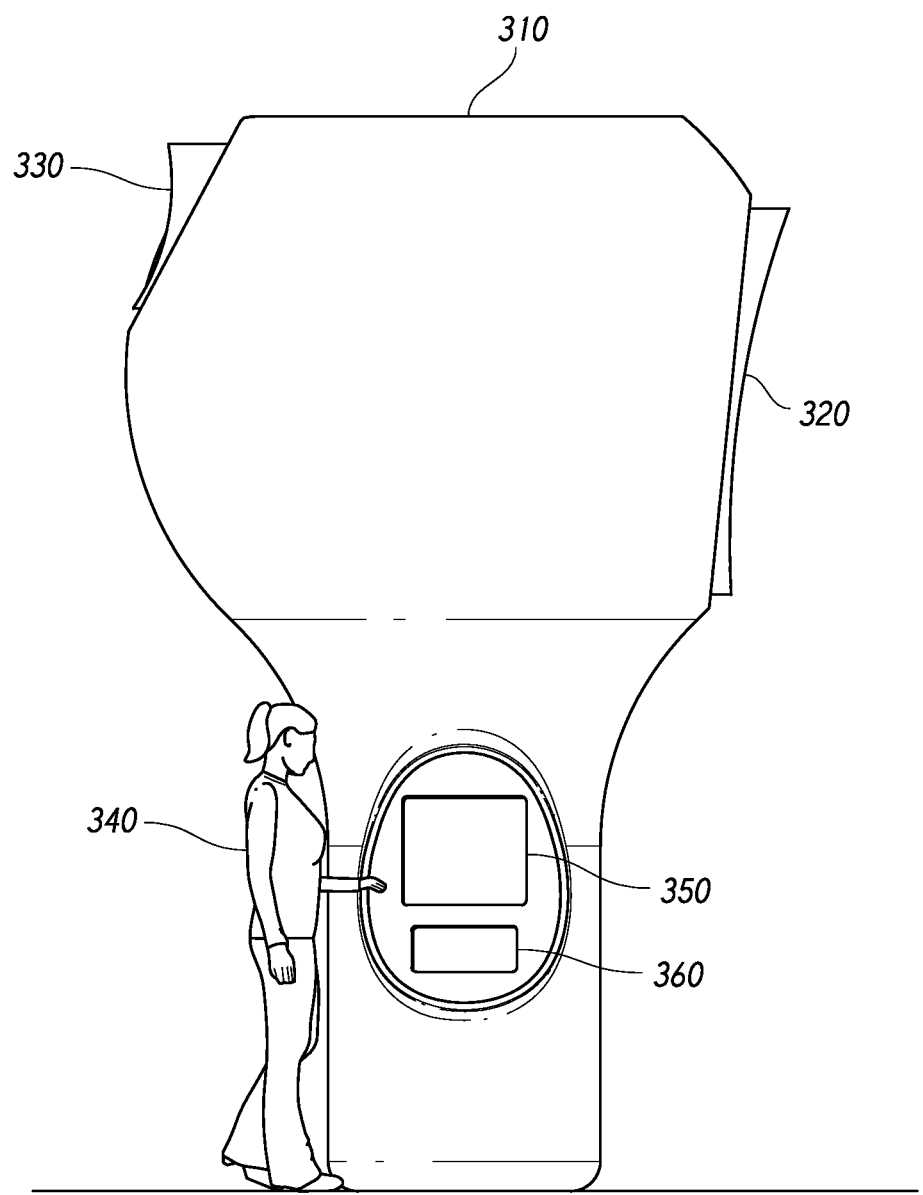
FIG. 3A shows a perspective view of an embodiment of a ground station.

FIG. 3A shows an embodiment of a ground station. The ground station shown in FIG. 3A includes sensors 310. These sensors can help the system provide, for example, landing or environmental information. Landing sensors can assist in coordinating approach and departure information for UAVs. The sensors also optionally can include one or more cameras that can provide information about the position or status of the UAVs, packages, batteries, other equipment stored within the ground station, or information about the ground station itself such as the condition of the station, or information about a user of the ground station, for example, by capturing a still or video image of the user. In an embodiment, the ground station uses a camera to aid in the landing of a UAV.

The ground station shown in FIG. 3A can have a UAV entry location 320. The UAV entry location can provide a known landing spot for a UAV. The entry location 320 can be sized to fit a variety of UAVs. For example, a delivery system may include different sized UAVs for a number of reasons, including differing capacity, flight distance, speed, power consumption, altitude capability, cost, or similar reasons. The vehicle entry location 320 therefore can accommodate vehicles of different sizes. The vehicle entry location 320 can also be positioned to reduce the possibility of collision between a UAV and a user of the system 350 or other obstructions. As shown in the ground station of FIG. 3A, the entry location 320 can be arranged such that it is physically above the head or reach of a human user 350. The entry location 320 is also located on the side of the ground station relative to the location of the user interface, further reducing the likelihood of a collision between a person and a UAV. The entry location 320 can also serve as a location for the ground station to remove the battery and/or package from the UAV.

The ground station can further include a UAV exit location 330. The exit location 330 provides a space for UAVs to take-off from the ground station. Additionally, the exit location 330 can serve as a location for the UAV to receive a battery and/or package from the ground station. As shown in the embodiment of FIG. 3A, the exit location 330 can be a different physical location from the entry location 320, allowing for simultaneous use of both the entry location 320 and exit location 330. In another embodiment, the entry location 320 and exit location 330 can be located in the same physical location to reduce the size or footprint of the ground station. Although shown with a single entry location 320 and a single exit location 330, multiple entry locations or exits locations can exist on the same ground station to increase the throughput of the system.

FIG. 3A also shows a user 340 interacting with a user interface 350. The user interface 350, as previously described, includes mechanisms for the user 340 to obtain data from the ground station or enter data into the ground station. The user interface 350 can also optionally communicate electronically with external devices such as cellular phones, tables, computers, or the like. The communications can be through WiFi, cellular data, Bluetooth, infrared, or other suitable electronic communications. The user interface can also communicate with a user identifier through other means, such as scanning a bar code, QR code, printed paper, fingerprint, retinal scan, voice print, or other suitable identifiers such as a password.

The ground station can also include a package drop box and/or pick up location. For example, the ground station can include a payload or package drop off or pick up slot 360. The slot 260 can accept packages from a user for transport by the delivery system. The slot 260 can also deliver packages that have been transported by the delivery system to a user. In an embodiment, the port accepts a package in a standardized size. In an embodiment, the slot 260 is a standardized size. In an embodiment, the port accepts objects that are placed into standardized containers for the delivery system. In an embodiment, the ground station places the object or package into a standardized payload. The ground stations can also be integrated into warehouses or dispatch centers and manned or unmanned package pickup locations. In an embodiment, one ground station is located in a dispatch center and a second ground station is located at a package pickup location. In an embodiment, the ground station is located at an unmanned package pickup location such as an Amazon Locker.

The ground station can optionally include the capability to scan package contents. Such a scan can help ensure that the system is not being used to transport illegal or dangerous substances. For example, a package can be scanned for explosives and liquids using an explosive detection system. If the package contains explosives or liquids, it can be rejected. Furthermore, the system can capture and store biometric identification data about its users. If a package is found to contain illegal substances, such as prohibited narcotics, the user or users associated with the package can be identified. These steps can serve as deterrents to use of the delivery system for improper purposes.

Figure 3B:
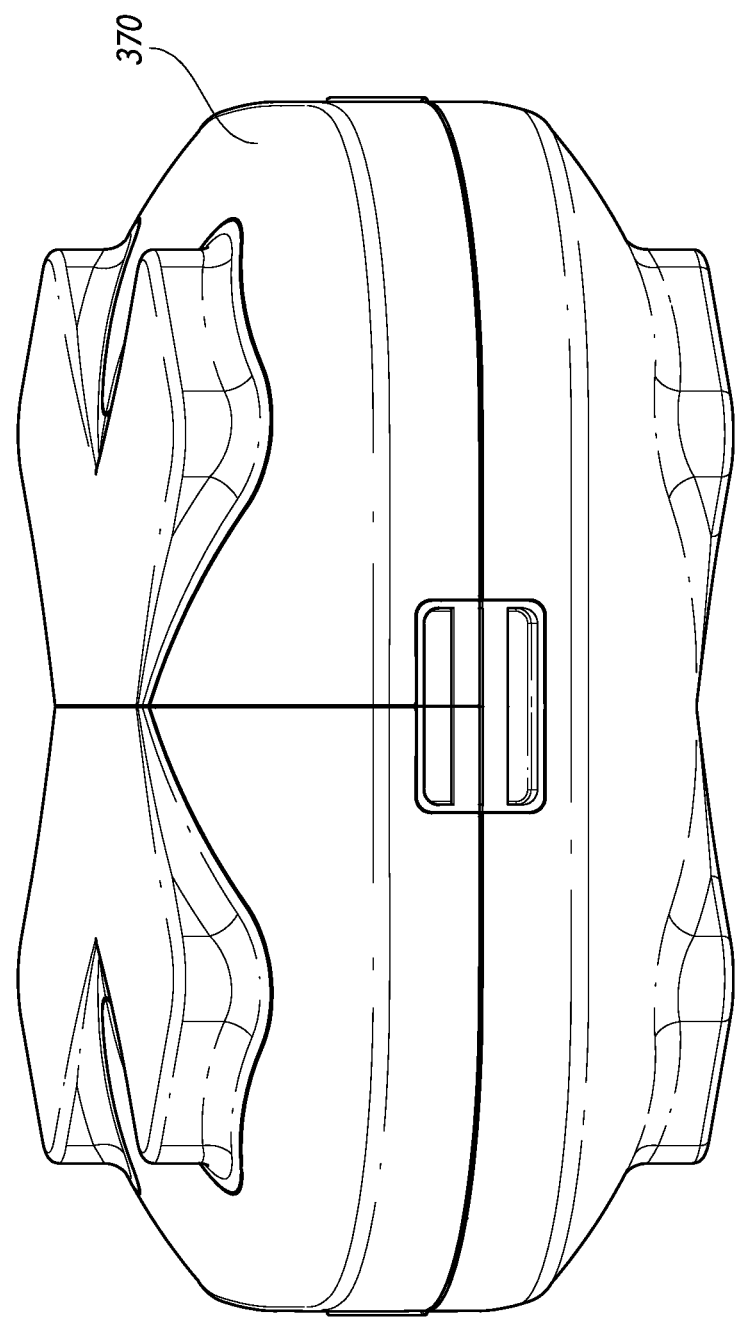
FIG. 3B shows an embodiment of a portable ground station.

FIG. 3B shows another embodiment of a ground station 370. The embodiment of the ground station 370 shown in FIG. 3B can be portable, a weight light enough to be carried by a human. The ground station 370 is shown in a mechanically closed position in FIG. 3B. In an embodiment, a UAV can fit inside the ground station 370 when it is in a mechanically closed position. Such an embodiment can make a system including a ground station 370 and UAV portable. In certain embodiments, the ground station also houses the logistics system in a portable enclosure.

Figure 3C:
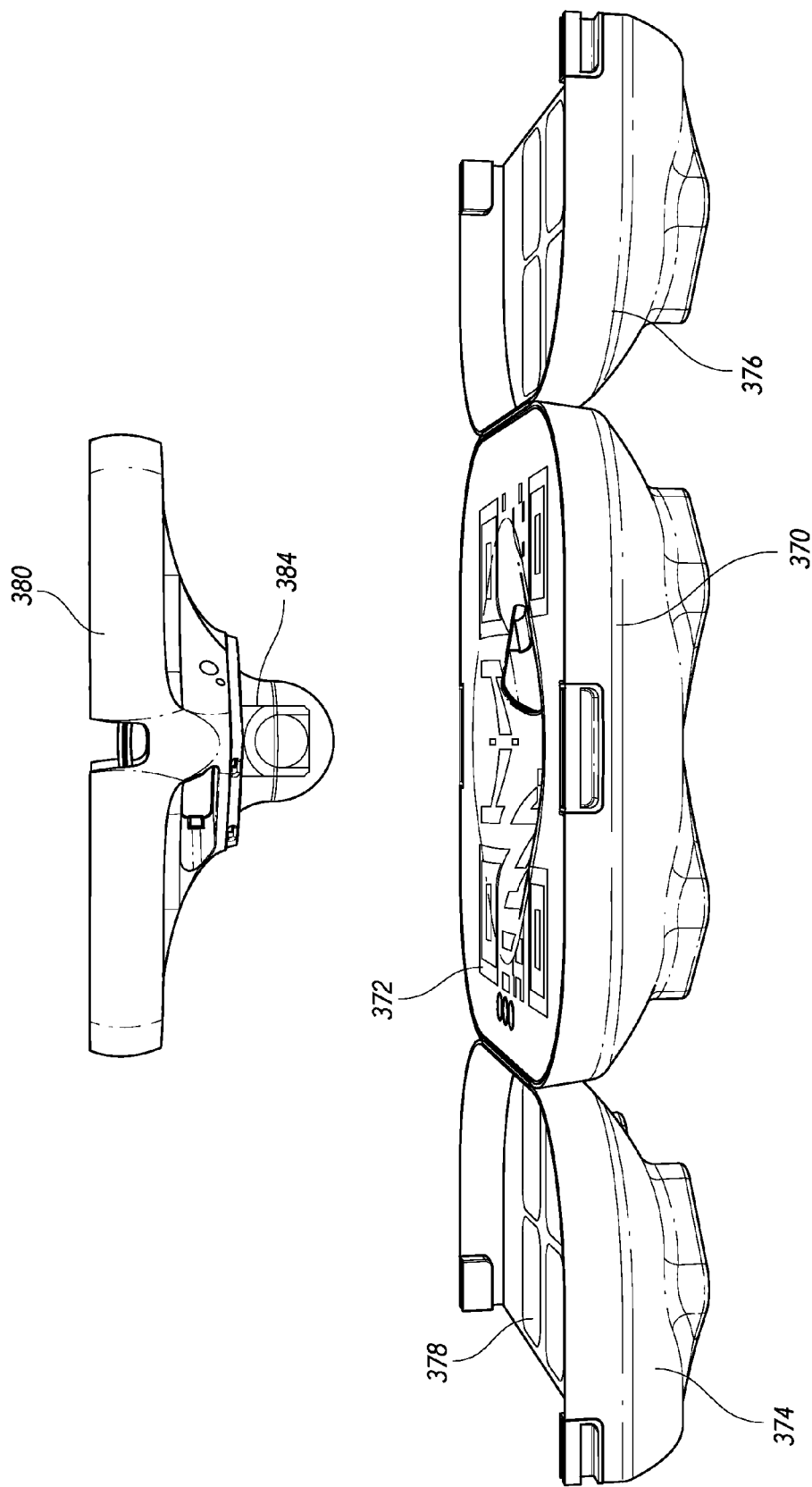
FIG. 3C shows an embodiment of a portable ground station and an embodiment of an unmanned aerial vehicle.

FIG. 3C shows a mechanically open view of the embodiment of FIG. 3B, along with an embodiment of a UAV. The ground station 370, when mechanically open, can reveal a take-off and landing spot, pad 372. This embodiment therefore shows an example of the take-off and landing spots being a single location. The pad 372 optionally can include a pattern to help guide the UAV. In an embodiment, the pattern is a passive visual target on the ground station. In an embodiment, the UAV uses a camera and machine vision to identify a visual target to increase positioning accuracy. In certain embodiments, the UAV itself can have a visual target and the ground station can use machine vision to help guide the UAV to increase positioning accuracy. As also shown on FIG. 3C, ground station 370 can have one or more doors, such as a left door 374 and a right door 376. The doors can help provide stability to the ground station. One or more of doors 374 and 376 can also include energy sources, such as solar panels 378. In an embodiment, the ground station 370 includes solar panels 378. The doors 374 and 376 are optional. For example, in certain embodiments, the ground station can draw power from an external source, such as the power grid or a generator.

The ground station 370 can also have a mechanical interface for a UAV. For example, the ground station 370 shown in FIG. 3C has a cavity for interfacing with UAV 380. UAV 380 can have a payload 384. For example, the payload can be a package container or a camera, or other suitable payloads as discussed elsewhere in this disclosure. The mechanical interface of the ground station 370 can allow the UAV to deliver its payload to the ground station 370.

Figure 3D:
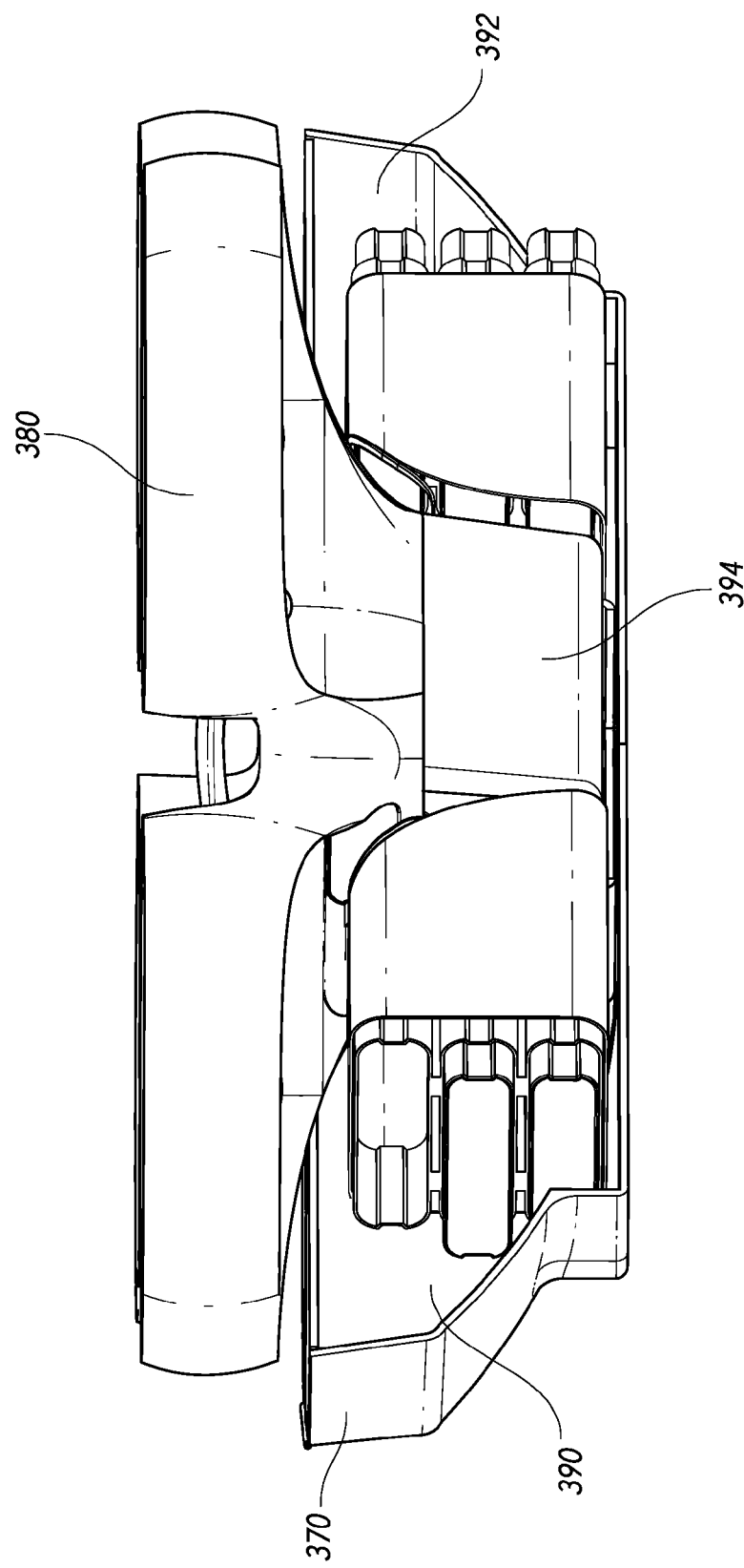
FIG. 3D shows a cross-sectional view of an embodiment of a portable ground station and an embodiment of an unmanned aerial vehicle docked.

FIG. 3D shows a cross-sectional view of the ground station 370 with a UAV 380 docked. The ground station 370 can include one or more bays 390 and 392. The bays 390 and 392 can store batteries, payloads, or the like, as previously discussed. For example, in an embodiment, bay 390 stores one or more batteries. In an embodiment, bay 392 stores one or more payloads. Alternatively, both bay 390 and bay 392 can store batteries. Such an arrangement may be beneficial, for example, when the payload will not be swapped between flight missions for UAV 380. The ground station 370 embodiment shown in FIG. 3D can also be equipped with a robotic battery swapping mechanism. In an embodiment, the battery swapping mechanism can allow for change of a battery within 30 seconds. The ground station 370 optionally can also include a robotic payload swapping mechanism. The payload swapping mechanism can similarly allow for the change of a payload within approximately 30 seconds. As further shown in FIG. 3D, the UAV 380 has a payload 394. The doors shown in FIG. 3C are not shown on FIG. 3D to better show the internal features of the ground station 370. However, the doors shown in FIG. 3C optionally can be attached to the ground station 370, as previously described.

The ground stations can detect weather conditions and permit the delivery system to adjust for weather conditions in real-time. The ground stations and delivery system can adjust the UAV mission based on real-time detected weather conditions. The ground stations can also collect data regarding conditions from external sources, such as, for example, other ground stations, UAVs, the internet, weather stations, or other suitable data sources. A group of ground stations can work together to develop or improve a weather model. The weather model or information can also be provided as a service of the logistics system. Based on the weather monitoring, the delivery system can make decisions such as whether to ground portions or segments of the delivery system.

The ground stations can also be equipped with sensors. In an embodiment, a ground station is equipped with chemical and ion sensors to measure air-flow detection and dynamics. In an embodiment, the ground stations are equipped with electro-magnetic sensors. The electro-magnetic sensors can be used, for example, to identify UAVs and packages that are permitted to enter the ground station.

Logistics System and Network

A third component of the delivery network is also shown in FIG. 1. The logistics system and network 140 provides for several aspects of the delivery system. The logistics system and network 140 controls the delivery system and manages routing for the UAV 100 and its payload. The logistics system can include artificial intelligence. In an embodiment, the delivery system is referred to as Matternet and the logistics system and network are provided by servers referred to as Matternet servers or the Matternet Operating System (MOS). The logistics system can be located at a ground station or at another suitable location, such as a cloud server. In an embodiment, the logistics system is located on a cloud server connected to the Internet. Each ground station can be effectively connected to the logistics system via the Internet, or through a private network. In certain embodiments, the ground stations are local extensions (and sensors) of a service provided by a cloud server. Similarly, the UAVs can be connected to the Internet directly, or in certain embodiments, through communications with a ground station. In certain embodiments, the UAVs are also connected to the logistics network. In certain embodiments, the UAVs are configured to upload telemetry and sensing date to the logistics network. The logistics system can be software, hardware, or a combination thereof. The logistics system and network controls the delivery system and manages package routing. The logistics system and network can communicate with the ground stations, UAVs, or both. In an embodiment, communications are routed via ground stations. For example, if all UAVs need to be grounded in a certain area, an instruction is sent to the ground station in that area. The ground station can then communicate with UAVs in that area to send commands to ground them. As a further example, if telemetry data suggests that a UAV has a defective motor that is likely to cause a crash, a "land" command is sent to the ground station closest to that vehicle and from the ground station to the vehicle. In another embodiment, the logistics system and network can communicate directly with UAVs and ground stations. For example, UAVs may be operating within a cellular network coverage area and be equipped with a 3G or 4G connection (or a similar data connection), that allows them to exchange messages with the logistics system and network directly.

In an embodiment, the logistics system and network integrates weather data from a number of ground stations to build a more accurate weather model. In an embodiment, the logistics system and network decides whether to ground a segment or area of the delivery system based on risk factors. The risk factors can include, for example, weather, information from authorities, the presence of emergency vehicles or personnel, time of day, or other suitable risk factors. In an embodiment, the logistics system and network grounds a segment based on a request from authorities.

Figure 4:
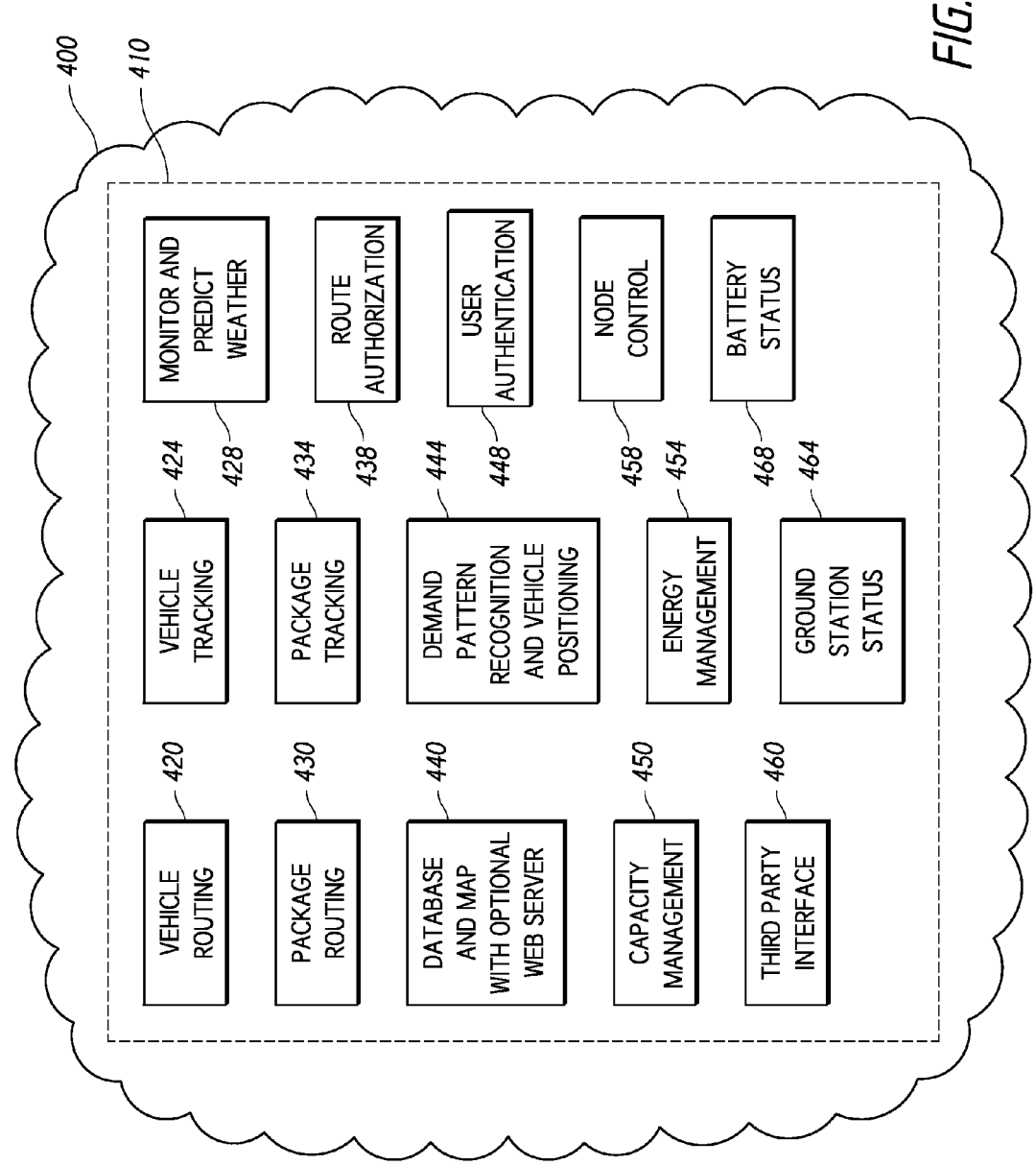
FIG. 4 shows a block diagram of several modules of an embodiment of a logistics network.

FIG. 4 is a block diagram of some of the modules of the logistics system and network 400. The modules can be housed on one or more servers 410. For example, the system 400 can be distributed among a plurality of servers. The servers can include complete modules, or a plurality of servers can together implement the modules defined herein. Portions of the logistics system and network can also be performed in UAVs or ground stations in certain embodiments. Furthermore, while the aspects of the system 400 are described as modules, they can in fact be functions, methods, or other portions of a solution that can include hardware and/or software. Not all of the modules need to be present in all embodiments of the logistics system and network 400. The modules described can be software routines, components, classes, methods, interfaces, applications, operating systems or a combination thereof.

The logistics system and network 400 can provide for vehicle routing 410. To move from point to point within the delivery system, the UAVs must perform some sort of navigation. As previously discussed, the navigation can be autonomous. For example, the vehicles can be uploaded with waypoint information for an upcoming mission when they are docked at a ground station. In an embodiment, the last waypoint is a holding area close to another ground station. In an embodiment, when the UAV reaches the last waypoint, it hovers and waits for instructions from the ground station or logistics system and network. The ground station and/or logistics system and network then instruct the UAV to dock in the ground station when it is safe to do so. The UAV can then dock using the full suite of sensors and information available to it. In operation, the vehicles are generally responsible for navigating from waypoint to waypoint. This can be autonomous or based on some information provided by the system. For known routes, the segments connecting waypoint are generally collision free with a safety margin. Following such a route allows the vehicles to navigate efficiently from ground station to ground station.

The UAVs can periodically, for example, every n seconds, send position and other state information to the ground station and/or logistics system and network. The state information can include, for example, battery level, weather conditions, vehicle condition, information repeated from a ground station, or other suitable state information. The location and state information can be used by the logistics system and network to provide space at the appropriate ground station. For example, the logistics system can reserve a space for an incoming vehicle or make a space available to other vehicles.

In certain embodiments, new waypoints can be provided to the UAV at any time by the logistics system and network. For example, not all of the mission waypoint need to be loaded into the UAV before it starts its mission. In an embodiment, the logistics system and network coordinates traffic by providing new waypoints to a UAV during a mission that are known to be collision free. These communications between the UAV and the logistics system and network can withstand long latencies in communications and require very low bandwidth in some embodiments.

The vehicle routing module 420 can include a routing algorithm. The routing algorithm can calculate the best route for moving a UAV from point to point. The routing algorithm can take into consideration factors such as, the distance, UAV capacity, ground station capacity, power levels, and battery availability to determine an appropriate vehicle route. In certain embodiments, the vehicle routing module 420 can also store information from previous flights to create a route. For example, a pilot can operate a UAV on a mission and the corresponding flight path can be used in the routing algorithm.

In addition to routing, the logistics system can include vehicle tracking 424. The vehicle tracking 424 communicates with one or more UAVs or ground stations to determine information about the UAVs. For example, the UAVs can report their current location and status. The vehicle tracking module 424 can keep track of the UAVs and allow the delivery system 400 to perform higher level functions, such as, for example, load distribution, coordinated deliveries, and other higher level functions.

The logistics system and network can optionally include a control room. The control room can be used to oversee a delivery system or portions of a delivery system. The control room, for example, can allow a remote pilot to fly a UAV. The control room can also permit user selection of an area of the network to be monitored or suspended.

In an embodiment, the UAVs can comprise a swarm of autonomous vehicles. The swarm can have functions that are not practical using individual UAVs. For example, a swarm of UAVs can be tasked with a mission that involves several autonomous UAVs that develop collective behavior. Such a use of the delivery system can promote scalability or other functions, such as increasing the likelihood of a successful delivery in a hostile environment by tasking multiple UAVs.

The logistics system and network 400 can also include a module to monitor and predict weather 428. The ability to monitor and predict weather 428 allows the delivery system to optimally fly the UAVs to avoid adverse weather conditions, for example. Adverse weather conditions can include wind, rain, sleet, snow, hail, temperature extremes, or other aspects of the weather. Additionally, the module that monitors and predicts weather 428 can inform the system about more optimal flight conditions. For example, while a UAV may be capable of flying in a given headwind, it may be more efficient to wait to conduct the flight until the headwind condition has reduced or has subsided.

The weather monitoring and prediction module 428 can be based on information received at one or more ground stations. As described elsewhere, the ground stations can collect information about local weather conditions. The weather monitoring and prediction module 428 can obtain this information from a ground station to help determine flight information. The module 428 can also obtain information from a number of ground stations and aggregate that information. For example, by analyzing data from a number of ground stations, the logistics system and network 400 can create more advanced weather models for a location, area, or region. These weather models can be more accurate that information collected from readily available sources. In an embodiment, the network 400 provides weather information as a service. In such an embodiment, a third party could request weather information the network 400.

The weather monitoring and prediction 428 can also be based on information available from external sources. For example, the weather monitoring and prediction 428 can communicate via the Internet to obtain weather information. This information can be obtained from weather services that provide the information to the general public or based on information that is available through a paid service. The weather monitoring and prediction 428 can use such information or can combine it with other sources such as other weather services or data from ground stations to create a weather model or to make a determination about the viability or efficiency of a route.

The logistics system and network 400 can also provide for package routing 430. For example, a package may need to move from one ground station to another directly or through a series of different ground stations. The package routing 430 module can decide on an appropriate route or path for a package. It can also ensure that the delivery system operates within its capacity. For example, to accommodate the capacity of the system, the route for a package may not be the route with the fewest number of hops or the least distance traveled. Alternatively, the route for a package can include intentional delay to allow for a more efficient route to become available for use. To ensure that the system is operating with capacity, the package routing module 430 can take into account a number of factors, such as, for example, the number of UAVs, their position, the capacity of particular UAVs, ground station status, ground station capacity, maximum ground station package size, energy, cost, battery availability, battery charge state, whether a route is in use, whether the system has grounded a route, distance, route capacity, package size, as well as avoiding areas of the delivery network that may be damages or unusable for weather or other reasons.

The package routing module 430 can include artificial intelligence. For example, the package routing module 430 can leverage technology such as Internet packet routing logic. That packet routing logic can be enhanced to accommodate for the complexity of the physical world while performing route calculations. For example, the package routing logic can take into account factors such as weather, time of day, or other factors that may not be as relevant to Internet packet routing logic. The package routing 420 module can also leverage CPU and storage technologies to enhance its capabilities, for example, by storing past performance data and analyzing it for future use. In an embodiment, the package routing module 430 makes a change to package routing based upon the past performance of a UAV on a known route.

In certain embodiments, the logistics system and network 400 is capable of tracking every package, UAV, ground station, and battery in the delivery system. The package tracking module 434 provides for tracking of the packages in the delivery system. The package tracking module 434 can provide, for example, the current location of the package, the movement history of the package, an estimated delivery time, physical information about the package (including the dimensions, weight, and content description), the planned route. The package tracking module 434 can also provide status alerts to users associated with a package. For example, the package tracking module 434 can provide delivery exceptions, delivery completion notifications, package acceptance notification, or other suitable information for an end user. The communications can be text messages, emails, voice recordings, status postings on a website, data provided to a mobile device application, or other suitable communications. In an embodiment, a tracking module 434 provides the last location for a package. The package tracking module can communicate with UAVs, ground stations, and other network modules to obtain and to update information about the package. In an embodiment, the communication between the package tracking module and a UAV occurs on a low bandwidth connection. In an embodiment, the package tracking module communicates with a ground station to receive package information.

The logistics system and network 400 can also provide route authorization 438. In certain embodiments, UAVs must be authorized before flying a route. In certain embodiments, a UAV must be authorized before landing at a ground station. In certain embodiments, the UAV cannot take-off without receiving authorization. The route authorization module 438 can obtain information from other portions of the delivery system to determine whether to authorize a UAV to fly a particular route. The route authorization module 438 can also obtain information from outside the delivery system to determine whether to authorize a route. For example, authorities can provide instructions to the delivery system that a particular route or group of routes should not be authorized.

The logistics system and network 400 can also maintain a database and map module 440. The map and database provide an interface for information about the delivery system, UAVs, packages, ground stations, or other aspect of the delivery system. The map and database 440 can optionally include a secure web server. The web server can make the delivery system more easily accessible. For example, aviation authorities for the region in which a UAV flight occurs can access the database through the web server. This functionality provides one safeguard against illegal uses of the system. It can also be used to investigate tampering with part of the delivery system or stolen UAVs, for example. The database can also be used to determine if certain routes are repeated, particularly within suspect areas.

The artificial intelligence of the logistics system and network 400 can include demand pattern recognition and vehicle positioning 444. For example, the software can predict demand patterns to optimally position UAVs within the delivery network. In an embodiment, usage patterns are used to position UAVs to meet forecast needs. The usage patterns can include, for example, frequency of use, time of use, user location, user requests, or other suitable inputs. By monitoring these inputs or past use of the system, the pattern recognition and vehicle positioning module 444 can algorithmically determine appropriate locations for locating delivery system components. In an embodiment, additional ground stations are added based on information obtained from demand pattern recognition. In an embodiment, additional UAVs are added to a segment based on demand pattern recognition.

The logistics system and network 400 can also include the ability to authenticate a user with user authentication 448. The user authentication 448 can include user identifiers such as a user name and password, biometric data, a mobile phone number, email address, RFID device, or other suitable identifier. For example, the user authentication 448 can provide a visual pattern for a user to provide to the system as an identifier. In certain embodiments, the visual pattern can be printed on a piece of paper. In an embodiment, the visual pattern can be displayed on a cell phone, tablet, or other portable computing device. In an embodiment, a user authenticates himself to the user authentication module 448 using a username and password. In an embodiment, a user authenticates herself to the user authentication module 448 using a fingerprint scan.

In certain embodiments, the logistics system and network 400 includes a capacity management module 450. The capacity management module 450 determines the capacity for each station, UAV, and route. By providing this functionality the delivery system can be optimized for example, for the speed of delivery or the cost of delivery. For example, certain routes may be more expensive at certain times. By moving capacity to less expensive routes at less expensive energy times, the delivery system can help optimize the cost of delivery. The capacity management module 450 can also match the supply of UAVs to demand. The capacity management module 450 can optimally position UAVs to corresponding places in the delivery network.

In certain embodiments, the logistics system and network 400 includes an energy management module 454. The energy management module 454 can manage the energy levels across the delivery system. For example, the energy management module 454 can manage the energy levels and demands for ground stations. As another example, the energy management module can provide energy information to be used in planning flights and routes for the UAVs. This can include an analysis of existing energy levels, projected needs, battery state, energy costs, and other factors relevant to energy management. The energy management module 454 can also shut down portions of the delivery network, such as individual ground stations or UAVs, to maximize the efficient use of energy. The energy management module 454 can also change station activity levels so that higher energy usages occur at times when energy costs are least. For example, the charging of batteries can be time shifted to times or locations with lower projected energy costs.

The logistics system and network 400 can also include a node control module 458. The node control module 458 can be centralized, distributed, or both. For example, the node control 458 can be provided for an individual ground station. The node control 458 can also control a group of ground stations that are associated in some way. For example, the ground stations can be associated geographically, by UAV routes, by delivery network, or other suitable associations. The node control module 458 can provide the ability to activate or deactivate nodes of the delivery system. In an embodiment, node control module 458 provides for deactivation of a node based on weather conditions. In an embodiment, node control module 458 provides for deactivation of a node base on reliability concerns.

A third party interface 460 can allow the delivery system to interface with third party software. For example, the third party interface 460 can provide tracking information to a device or application that is external to the delivery system. In an embodiment, third party interface 460 provides a communications interface for an application running on a mobile phone, tablet, or other computing device. In certain embodiments, third party interface 460 provides the ability for a user to schedule delivery or pickup of a package using the delivery system.

The logistics system and network 400 can also provide for ground station status and control 464. Many of the ground station operations are described elsewhere with respect to the ground station portion. The ground station status and control module 464 can provide these operations and coordinate them with the delivery system. For example, the ground station status and control module 464 can provide for ground station package and UAV handling. The module 464, for example, can provide sorting and storing packages, package loading and unloading, managing take-off and landing, planning UAV flight routes, communicating with the UAVs, updating flight route plans (both before and during a flight mission), and other suitable functions. In certain embodiments, the ground station status and control module 464 can include artificial intelligence to optimize its functions. The ground station status and control module 464 can also control robotics associated with the ground station for movement of UAVs, packages, and batteries in the physical space of the ground station. The ground station status and control module 464 can leverage warehouse management technologies as a basic framework for operation.

The battery status module 468 provides for the control and monitoring of batteries and battery information in the delivery network. For example, the battery status module 468 can provide information about the location, charge level, number of cycles, dimensions, capability, current charge state, and other suitable information about each battery in the delivery system. The battery status module 468 can also make decisions about when and how to charge batteries. For example, certain batteries benefit from specific charging or discharging patterns. The battery status module 468 can provide this information to the charging location to make sure that each battery is charged properly. The battery status module 468 can also provide information to the delivery network about the specific battery that should be used for each flight mission. The module 468 can also make recommendations about replacement of batteries within the delivery network.

Transportation Network Topology Example

Figure 5:
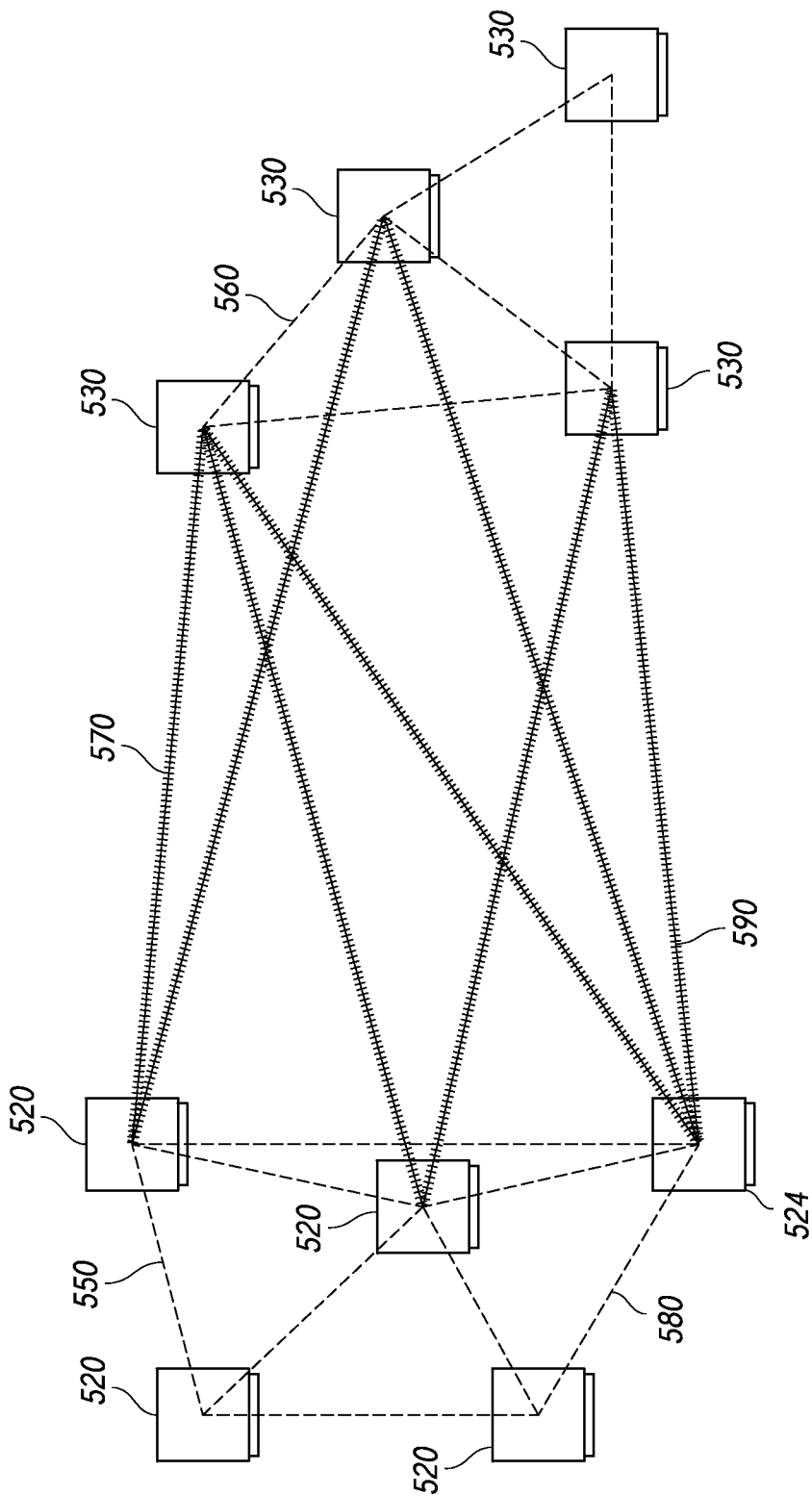
FIG. 5 shows a topology diagram for an embodiment of a transportation network including a plurality of ground stations.

FIG. 5 shows a topology diagram for an embodiment of a transportation network including a plurality of ground stations. The embodiment shown in FIG. 5 includes two clusters of ground stations, the ground stations 520 and ground stations 530. In this shown embodiment, there are short range routes 550 between ground stations 520 and short range routes 560 between ground stations 530. The short range routes 550 and 560 can be served by UAVs that are optimized for the short range routes. There are also long range routes 570 between ground stations 520 and 530. The long range routes 570 can be served by UAVs that are optimized for longer range routes. For example, quadcopter UAVs can be used for short range routes and fixed wing UAVs can be used for long range routes. In an embodiment, the same UAV is used for a short range route and for a long range route. In an embodiment, a higher capacity battery is used for a long range route.

FIG. 5 also shows how a transportation network can be expanded. A new ground station 524 can be added to the transportation network. When new ground station 524 is added, new short range routes 580 are added to appropriate ground stations in the cluster of ground stations 520. New long range routes 590 are added to appropriate ground stations in the cluster of ground stations 530. The transportation network is thereby expanded. This expansion, for example, can serve a new location. In certain embodiments, the ground station can be within the payload capacity of a UAV. The UAV can position or reposition the ground station such that the delivery network becomes a self-building network. In an embodiment, a self-building network is used to create a first response network.

The delivery network can share the design principles of the internet. The network can be a decentralized and can be a peer-to-peer network that is built by its users. For example, if two users within the range of the available UAVs install ground stations and have at least one vehicle available they instantly create a mini-delivery network. Or, as just described with respect to FIG. 5, when anyone installs a new ground station that is within range of an existing network is installed, the network is instantly reconfigured and the new station becomes part of it. Like the Internet, the delivery system achieves high-volume transportation by transporting a very large number of small packages (rather than a smaller number of big packages). A delivery of matter through the delivery system, may be arriving from a multiple origins and "assembled" at the point of delivery, similar to how information arriving at one's internet browser today, may be arriving from multiple sources around the globe. In this internet analogy of the delivery system, packages are analogous to information packets, internet routers to ground-stations; and UAVs to copper lines, optical fiber or wireless networks.

Example of Delivery System in Use

Figure 6:
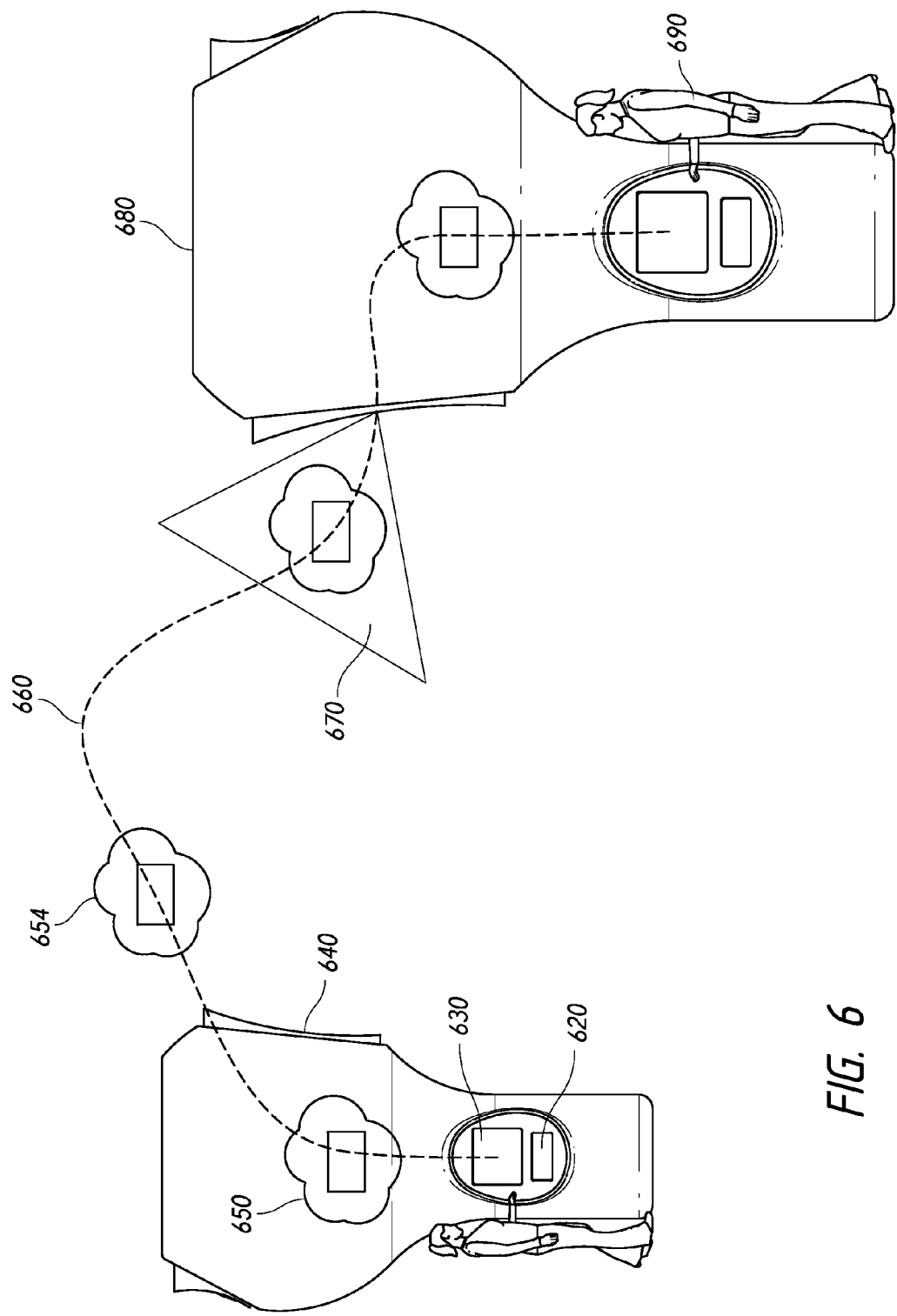
FIG. 6 shows a visual flow chart for an embodiment of a method of using an embodiment of a delivery network to transport a package from a first ground station to a section ground station.

FIG. 6 shows a visual flow chart of an embodiment of the delivery system in use. In the example shown in FIG. 6, a first user uses the delivery system to send a package to a second user 690. The first user and second user 690 can be separated by a distance of kilometers, for example. To use the system to deliver an object, the first user walks to a ground station 640. The user identifies herself to the system with user interface 630 and places the object inside ground station 640 through an interface 620. Optionally, ground station 640 can include an automated robotic system that takes the package either in a standard box or places the package into a standard box and stores it in a slot waiting for a UAV 650 to arrive. When UAV 650 is approaching the station, the object moves into a loading area 630. The UAV 650 picks up a payload containing a package with the object automatically, swaps its battery for a fully charged one and starts its trip to the destination ground station 680. While UAV 650 is leaving the station, another UAV can arrive to deliver another package, and many other UAVs can transport packages around the network that cover the network.

The UAV 650, after it leaves ground station 640, can reach one or more waypoints 654 that help it navigate. It autonomously follows a rout 660 to a last waypoint 670. At the last waypoint 670, UAV 650 communicates with destination ground station 680. Destination ground station 680 provides UAV 650 with information that will help it navigate precisely to ground station 680 and land. Once UAV 650 autonomously lands at destination ground station 680, the UAV 650 unloads the package into ground station 680. The package can then be moved automatically into a waiting slot.

The system can then communicate with user 690. For example, the system can send a text message, email, or other notification to user 690, informing that there is an object for him in the station. User 690 can alternatively receive updates from the system throughout the process, so that user 690 is kept up to date regarding the status of the delivery.

To receive the package, user 690 walks to the station, identifies herself and takes the package.

Operation without Ground Station

In certain embodiments, the delivery system can be used without a ground station. For example, the delivery system can be used to deliver a package to an area that does not yet have a ground station in place. In such an embodiment, a user can provide the information necessary to plan and execute the flight mission. For example, the user can provide the pick up location, drop off location, weight and dimensions of the package, and other relevant information.

The logistics system and network can then determine a UAV suitable for the mission and plan a flight path. The selected UAV can execute the flight plan, either delivering a package to the location without a ground station or flying to the location to pick up a package. The system can then notify the user to interact with the UAV. The user can identify herself to the vehicle, for example, using a cell phone. The user then can place the package on the UAV or receive the package from the UAV. The vehicle can optionally include a scanner to check for explosive or dangerous materials. If such materials are detected, the UAV can abort the mission. The user can then inform the logistics system that the UAV is ready to depart. The logistics system then sends a command for the UAV to take-off and fly to a known ground station.

Delivery System Proceeds Distribution

In an embodiment, the delivery system is an open, decentralized infrastructure system that allows quick deployment in many different areas simultaneously. Components of the system can be owned by different parties. For example, different entities can own ground stations and the UAVs. The logistics system and network can be operated by yet another entity. When the delivery system is used, the revenue generated by the system can be divided between the various entities. For example, the proceeds can be split such that one percentage goes to the owner of a first ground station, a second percentage goes to the owner of a second ground station, a third percentage goes to the owner of the UAV, and a fourth percentage goes to the owner or operator of the logistics system and network. In an embodiment, the logistics system and network owner charges a percentage for its use. In an embodiment, the logistics system and network owner charges a fee for its use. In certain embodiments, the fee or percentage for the logistics system and network owner is based on each flight authorized by the logistics system and network.

Metropolitan Area Delivery Network Example

The delivery network can be deployed, for example, over a metropolitan area. Such a delivery network could provide for efficient urban transport. It could also provide for express delivery, for example, for good purchased electronically. For example, in a delivery network substantially covering Los Angeles could include a 50 km by 50 km coverage area. Ground stations could be advantageously positioned with approximately a 1 km spacing. In such an embodiment, an average shipment might be approximately 10 km. A system based on the delivery network could average hundreds of thousands of shipments per day. Such a system could potentially provide delivery within the hour, at virtually any time of day, virtually anywhere in its coverage area, regardless of traffic. The good transported by such a system could include, for example, e-commerce small goods and electronics, diagnostics (for example, samples or tests for the medical field), documents, food, or other suitable packages. In an embodiment, the weight of the package is less than 5 kg. The system could advantageously provide for high frequency or time sensitive deliveries. The cost of such a delivery system can depend on factors such as, for example, the cost of the UAVs, the costs of UAV maintenance, the lifespan of the UAVs, the ground station cost, the cost of ground station maintenance, the lifespan of the ground stations, and the cost of a logistics system. For example, certain assumptions can be made to determine a projected cost of the delivery system. In an embodiment, the average vehicle life is 3 years, with a maintenance cost of $100 per year. In an embodiment, the vehicle cost is approximately $3,000. In an embodiment, the average ground station life is 3 years, with a maintenance cost of $100 per year. In an embodiment, the ground station cost is approximately $3,000. In the Los Angeles example, the area covered is 2,500 square kilometers. A network could be developed with approximately 2,150 UAVs and 2,000 ground stations. In an embodiment, there are 2,144 vehicles and 1,925 ground stations. This results in approximately 1.11 UAVs per station. In an embodiment, the vehicle range is approximately 5 km. If the average shipment distance is 10 km, the vehicles could average approximately 2 hops per shipment. Assuming the UAV must fly these two hops per shipment, an approximate costs for the shipment could be $0.50.

In addition to the ground stations, UAVs, and logistics system, and urban network might also include a control room. The control room could be staffed with a number of operators working in shifts. Each operator could be responsible for overseeing a fairly large number of vehicles. For example, each operator could oversee 100 UAVs. In such an embodiment, for the Los Angeles example, the total cost per shipment could be approximately $0.50. That cost per shipment could include vehicle costs, station costs, battery costs, energy cost, staff operators, and some overhead for the logistics system.

Delivery Network for the Transportation of Diagnostic Samples, Medicines, and Medical Supplies Example The delivery network also can be deployed, for example, over a geographic area to provide for the transportation of diagnostic samples, results, medicines and medical supplies. Such a delivery network could provide for reliable, timely, and low cost transportation. The delivery network can also provide for delivery of these assets without requiring essential personnel to abandon their tasks to transport the assets back and forth. For example, the delivery network could provide for transportation of goods between Units of Primary Attention (UNAPs) and Health Centers (HCs—rural clinics, dispensaries, polyclinics, sanitary centers, diagnostic centers, hospitals), to overcome hard-to-access locations, infrastructure conditions and less efficient distribution schedules. In an embodiment, the delivery network is a temporary network setup in a disaster relief area. In an embodiment, the delivery network is located in hard-to-access locations. In an embodiment, the delivery network is at least partially located in a mountainous area. In certain embodiments, the delivery network is located where road infrastructure is inefficient or non-existent. In certain embodiments, the delivery network is configured to operate with low budgets to support its building and maintenance. Such a system could also allow the exchange of other goods through the network once it is configured.

The delivery network can be deployed based on a social franchise model. For example, a community can contribute to the network's operations and scalability, by providing technical capabilities or support, for example, running, maintaining, or repairing the network. The delivery network could therefore provide new income opportunities for local operators.

The preceding examples can be repeated with similar success by substituting generically or specifically described operating conditions of this disclosure for those used in the preceding examples.

Although the disclosure has been described in detail with particular reference to these preferred embodiments, other embodiments can achieve the same results. Variations and modifications of the present disclosure will be obvious to those skilled in the art and it is intended to cover all such modifications and equivalents.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps can be altered, added, removed, or rearranged. While certain embodiments have been explicitly described, other embodiments will become apparent to those of ordinary skill in the art based on this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. In some embodiments, the algorithms disclosed herein can be implemented as routines stored in a memory device. Additionally, a processor can be configured to execute the routines. In some embodiments, custom circuitry may be used.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope. Accordingly, the present disclosure is not intended to be limited by the recitation of the preferred embodiments.

What is claimed is:

1. A delivery system comprising:
   one or more unmanned delivery vehicles configured for autonomous navigation;
   a plurality of ground stations configured to communicate with the one or more unmanned delivery vehicles and provide location information to the one or more unmanned delivery vehicles to aid in locating a ground station location, wherein each of the plurality of ground stations further comprises a landing location comprising a cavity capable of physically containing a package; and
   a processor configured to identify a route from a first of the plurality of ground stations to a second of the plurality of ground stations based on geographic data and providing the route to the one or more unmanned delivery vehicles for use in the autonomous navigation from the first to the second ground station.

2. The delivery system of claim 1, wherein the one or more unmanned delivery vehicles are aerial vehicles.

3. The delivery system of claim 2, wherein the aerial vehicles comprise a fixed wing and a rotor.

4. The delivery system of claim 2, wherein the aerial vehicles comprise a payload interface capable of accepting a package for transport on the delivery system.

5. The delivery system of claim 4 wherein the package for transport is a camera configured to couple to the payload interface.

6. The delivery system of claim 4, wherein the aerial vehicles comprise safety measures for protecting the package.

7. The delivery system of claim 6, wherein the safety measures include one or more of a parachute or an airbag.

8. The delivery system of claim 1, wherein the processor is configured to recognize demand patterns and position the one or more unmanned delivery vehicles in a location to meet the demand pattern.

9. The delivery system of claim 1, wherein the processor authorizes the route for the one or more unmanned delivery vehicles.

10. The delivery system of claim 1, wherein the information provided by the ground stations is a pattern on a landing pad.

11. The delivery system of claim 1, further comprising a plurality of batteries for the one or more unmanned delivery vehicles.

12. The delivery system of claim 11, wherein the plurality of ground stations stores and charges the plurality of batteries for the one or more unmanned delivery vehicles.

13. The delivery system of claim 1, wherein the geographic data is a series of waypoints for use with a global navigation satellites system.

14. The delivery system of claim 13, wherein the information provided by the ground station allows the one or more unmanned delivery vehicles to identify the ground station location with greater accuracy than is provided by the waypoints.

15. A ground station for use in a delivery system comprising unmanned aerial vehicles, the ground station comprising:

a landing location configured to receive one or more unmanned aerial delivery vehicles wherein the landing location comprises a cavity capable of physically containing a package;

a communications interface configured to communicate with the one or more unmanned delivery vehicles and at least one additional ground station; and a guidance measure configured to assist the one or more unmanned delivery vehicles in locating the landing location.

16. The ground station of claim 15, wherein the guidance measure comprises a pattern printed on the landing location.

17. The ground station of claim 15, wherein the guidance measure comprises an ultrawideband beacon.

18. The ground station of claim 15, further comprising a weather monitoring system.

19. The ground station of claim 18, wherein the weather monitoring system is capable of measuring the wind speed.

20. The ground station of claim 15, further comprising a robotic system for changing batteries of the one or more unmanned delivery vehicles.

21. The ground station of claim 15, further comprising a robotic system for changing packages for the one or more unmanned delivery vehicles.

22. The ground station of claim 15, wherein the ground station is portable.

23. The ground station of claim 15 further comprising a solar panel capable of providing power to the ground station.

24. The ground station of claim 15, further comprising a charger capable of charging batteries of the one or more unmanned delivery vehicles.

25. The ground station of claim 15, wherein the system for guiding comprises a series of waypoints for use with a global navigation satellites system.

26. The ground station of claim 25, wherein the system for guiding further comprises a beacon that allows the one or more unmanned delivery vehicles to identify a ground station location with greater accuracy than is provided by the waypoints.

27. The ground station of claim 25, wherein the system for guiding further comprises a pattern printed on the landing location.

28. The ground station of claim 15, wherein the communications interface is further configured to send to and receive data from a logistics system.

29. The ground station of claim 28, wherein the logistics system is located on a cloud server.

30. The ground station of claim 28, wherein the logistics system is configured to send instructions to the ground station to be routed to the one or more unmanned delivery vehicles.

31. A computer system for managing a delivery system of unmanned aerial vehicles comprising:

one or more hardware processors in communication with a computer readable medium storing software modules including instructions that are executable by the one or more hardware processors, the software modules including at least:

a vehicle routing module that determines a route between a first ground station and a second ground station for an unmanned aerial vehicle, wherein the vehicle routing module includes stored information from a successful flight of the unmanned aerial vehicle while under the control of a pilot;

a vehicle tracking module that provides the current location of an unmanned aerial vehicle;

a package routing module that determines a delivery path for a package, the delivery path including the first and second plurality of ground stations;

a package tracking module providing the current location of the package on the delivery path; and a route authorization module that conditionally authorizes the unmanned aerial vehicle to fly the route between the first and second ground stations to move the package along the delivery path for the package.

32. The computer system of claim 31, wherein the software modules further comprise a weather monitoring module configured to determine appropriate flying conditions between the first and second ground station and communicate with the route authorization module to authorize the flight when the conditions are appropriate.

33. The computer system of claim 31, wherein the route authorization module is configured to refuse to authorize a flight based on a user command.

* * * * *